US008109361B2

(12) United States Patent
Tsugihashi et al.

(10) Patent No.: US 8,109,361 B2
(45) Date of Patent: Feb. 7, 2012

(54) SOLID-BORNE SOUND REDUCING STRUCTURE

(75) Inventors: Kazuki Tsugihashi, Kobe (JP); Toshimitsu Tanaka, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 12/309,325

(22) PCT Filed: Jul. 19, 2007

(86) PCT No.: PCT/JP2007/064273
§ 371 (c)(1),
(2), (4) Date: Jan. 14, 2009

(87) PCT Pub. No.: WO2008/010554
PCT Pub. Date: Jan. 24, 2008

(65) Prior Publication Data
US 2009/0283356 A1 Nov. 19, 2009

(30) Foreign Application Priority Data
Jul. 20, 2006 (JP) ................................ 2006-197540

(51) Int. Cl.
*E04B 1/82* (2006.01)
*E04B 9/00* (2006.01)
*F16F 7/00* (2006.01)
*F16F 15/00* (2006.01)

(52) U.S. Cl. ........ 181/207; 181/284; 181/285; 181/286; 181/290

(58) Field of Classification Search .................. 181/207, 181/209, 286, 290
See application file for complete search history.

(56) References Cited

U.S. PATENT DOCUMENTS 3,804,196 A * 4/1974 Horn et al. .................... 181/285
(Continued)

FOREIGN PATENT DOCUMENTS

EP 1 705 643 A1 9/2004
(Continued)

OTHER PUBLICATIONS

International Search Report of PCT/JP2007/064273 mailed Nov. 20, 2007.

(Continued)

*Primary Examiner* — Elvin G Enad
*Assistant Examiner* — Christina Russell
(74) *Attorney, Agent, or Firm* — Stites & Harbison PLLC; Juan Carlos A. Marquez, Esq.

(57) ABSTRACT

It is an object of the present invention to provide a solid-borne sound reducing structure which is able to reduce solid-borne sound with a simple configuration, highly durable, and being less degraded.

There is provided a solid-borne sound reducing structure (100) in which a surface plate part (1) including a gas ventilating part (1*a*) which allows gas to pass through along a thickness direction is disposed by means of an outer peripheral wall part (2) on a structure (200) that radiates noise while vibrating, so as to at least partially cover a surface (200*a*) of the structure (200). The surface plate part (1) is supported by the outer peripheral wall part (2) so as to be integrally vibrated with the surface (200*a*) of the structure (200). In addition, the outer peripheral wall part (2) supports the surface plate part (1) in such a manner that an internal gas chamber is formed between the surface (200*a*) of the structure (200) and the surface plate part (1).

3 Claims, 31 Drawing Sheets

U.S. PATENT DOCUMENTS

| | | | | | |
|---|---|---|---|---|---|
| 3,905,443 | A | * | 9/1975 | Sieuzac | 181/291 |
| 4,782,913 | A | * | 11/1988 | Hoffmann et al. | 181/286 |
| 4,821,841 | A | * | 4/1989 | Woodward et al. | 181/286 |
| 4,842,097 | A | * | 6/1989 | Woodward et al. | 181/286 |
| 5,661,273 | A | * | 8/1997 | Bergiadis | 181/290 |
| 5,756,942 | A | * | 5/1998 | Tanaka et al. | 181/207 |
| 5,895,538 | A | * | 4/1999 | Hatayama et al. | 156/87 |
| 6,082,489 | A | * | 7/2000 | Iwao et al. | 181/286 |
| 6,260,660 | B1 | * | 7/2001 | Yoerkie et al. | 181/290 |
| 6,720,069 | B1 | * | 4/2004 | Murakami et al. | 428/319.3 |
| 2003/0188921 | A1 | * | 10/2003 | Kakimoto et al. | 181/285 |
| 2005/0126848 | A1 | * | 6/2005 | Siavoshai et al. | 181/207 |
| 2005/0241877 | A1 | * | 11/2005 | Czerny et al. | 181/293 |
| 2007/0017739 | A1 | * | 1/2007 | Yamagiwa et al. | 181/209 |
| 2008/0128200 | A1 | * | 6/2008 | Tsugihashi et al. | 181/284 |
| 2008/0135327 | A1 | * | 6/2008 | Matsumura et al. | 181/151 |
| 2008/0135332 | A1 | * | 6/2008 | Ueda et al. | 181/284 |
| 2009/0084627 | A1 | * | 4/2009 | Tsugihashi et al. | 181/290 |

FOREIGN PATENT DOCUMENTS

| | | |
|---|---|---|
| JP | 59-61888 | 9/1982 |
| JP | 2004-084339 | 8/2002 |
| JP | 2005-134653 | 10/2003 |
| JP | 2006-152696 | 11/2004 |
| JP | 2006-152696 | 6/2006 |
| WO | WO 2005/043509 A1 | 5/2005 |

OTHER PUBLICATIONS

Office Action from Chinese Patent Office for Application 200780020992.2 dated Sep. 9, 2010.

The Second Office Action issued on Feb. 24, 2011 by the Chinese Patent Office for Application No. 200780020992.2 (7 pages) with an English language translation (3 pages).

* cited by examiner

SOLID-BORNE SOUND REDUCING STRUCTURE

TECHNICAL FIELD

The present invention relates to structures for reducing sound (solid-borne sound) radiated from solid surfaces of structures such as various machines or piping.

RELATED ART

To reduce solid-borne sound, a structure has been conventionally known in which a sound insulating member, such as a sound insulating plate, is elastically supported by a spring, rubber, or the like on a surface of a structure which radiates solid-born sound. According to this structure, it can be expected that a vibration of the sound insulating plate, which is a noise radiating surface after taking anti-noise measures, becomes smaller than a vibration of the surface of the structure which was the noise radiating surface before taking the anti-noise measures, and radiation sound consequently becomes small. A solid-borne sound reducing structure described in Patent Document 1 has a configuration in which a noise-proof cover is mounted via an elastic body component on a structure that radiates solid-borne sound. The elastic body component is stuck on the entire perimeter of the noise-proof cover to define a space between the structure and the noise-proof cover as a closed space insulated from external air. In this structure, because a silicon sealant of a solventless reactive curing type having heat resistance, oil resistance, and metal adhesiveness is used as an adhesive for sticking the elastic body component, the mounting of the noise-proof cover can be realized while securing excellent adhesiveness and sealing properties. In addition, the entire perimeter of the noise-proof cover is sealed to suppress a sound which leaks from the space between the structure and the noise-proof cover to the outside, thereby improving sound insulating properties.

Patent Document 1: Japanese Patent Laid-Open Publication No. S59-61888

DISCLOSURE OF THE INVENTION

Problems to be Solved by the Invention

However, when resin materials such as rubber is used for the elastic body component as in the case of the solid-borne sound reducing structure described in Patent Document 1, there is a possibility that aged deterioration easily causes decrease in durability of the structure itself or degradation of solid-borne sound reducing performance, and, in particular, there is susceptibility to influences of deterioration resulting from a use environment, such as elevated temperatures or high humidity, which becomes problematic. Even though a metallic spring is used as the elastic body component, there is a possibility that fatigue is caused by repetitively receiving vibrations, resulting in the decrease in durability or the degradation of solid-borne sound reducing performance.

Further, because it is necessary to elastically support the sound insulating plate, configuration becomes complicated, which could readily increase the number of components, and could increase the cost of manufacturing the solid-borne sound reducing structure.

In view of the aforesaid current situations, it is an object of the present invention to provide a solid-borne sound reducing structure which is able to reduce solid-borne sound with a simple configuration, highly durable, and being less degraded.

Means for Solving the Problems

A solid-borne sound reducing structure according to the present invention is related to a structure for reducing sound (solid-borne sound) radiated from structures such as various machines or piping.

Then, in order to attain the aforesaid object, the solid-borne sound reducing structure according to the present invention has several features as described below. More specifically, the solid-borne sound reducing structure of this invention has one of the below-described features alone or in combination thereof appropriately.

In order to attain the above-described object, a first feature of the solid-borne sound reducing structure according to the present invention is that the solid-borne sound reducing structure, which is mounted on a surface of a structure that radiates noise while vibrating for reducing noise radiated from the surface of the structure to surroundings, comprises a surface plate part which is disposed so as to at least partially cover the surface of the structure and provided with a gas ventilating part which allows gas to pass through in a thickness direction, and an outer peripheral wall part which is a wall part disposed on the surface of the structure for supporting an outer peripheral edge of the surface plate part in such a manner that the surface plate part is integrally vibrated with the surface of the structure and forming an internal gas chamber between the surface of the structure and the surface plate part.

According to this configuration, the whole area of the surface plate part is almost uniformly vibrated along with the surface of the structure. Here, because the gas ventilating part is provided to the surface plate part, an acoustic radiation efficiency (a conversion efficiency from vibration to sound) of the surface plate part is reduced. As a result, the sound radiated from the vibrating structure (solid-borne sound) can be reduced. Further, because of the configuration in which the internal gas chamber is separated from an exterior space in an in-plane direction by the outer peripheral wall part, it can be prevented by the outer peripheral wall part that the sound radiated from the surface of the structure into the internal gas chamber propagates to the exterior space while traveling along the in-plane direction, which in turn allows restriction of sound leakage to the exterior space. As such, because of the simple configuration in which the outer peripheral edge of the surface plate part is supported by the outer peripheral wall part, the cost of manufacturing the structure can be suppressed, and because of being constructed without using an elastic body component such as rubber or a metallic spring, less influences of aged deterioration is obtained, and durability can be improved.

Further, a second feature of the solid-borne sound reducing structure according to the present invention is to further comprise a partition wall part which is a wall part disposed on the surface of the structure for supporting the surface plate part, and partitioning the internal gas chamber in the in-plane direction of the surface of the structure to form a plurality of divided internal gas chambers.

A vibration of the structure is not always uniform all over the surface, and there may be cases where vibration amplitude or a phase varies in part, or both the vibration amplitude and the phase differ, i.e. the surface of the structure could have a vibration distribution during the vibration. In this case, even when no resonance of the surface plate part is occurred, the vibration distribution can be generated in the surface plate part. The generation of the vibration distribution presents a problem in which the effect of reducing solid-borne sound (a solid-borne sound reducing effect) is deteriorated.

In the configuration having the second feature, however, an interval of supporting the surface plate part (a support span) can be shortened by the further provision of the partition wall part. Accordingly, even though the surface of the structure has the vibration distribution during vibration, the vibration distribution that can be generated in the surface plate part can be minimized in a region partitioned by the partition wall part, which makes it possible to attain a greater effect of reducing solid-borne sound.

In addition, because the shortened support span of the surface plate part causes a resonant frequency of the surface plate part to become a higher frequency, resonance can be prevented, to thereby allow reduction of solid-borne sound in a broader frequency range.

On the other hand, when sound resonance is generated in a specific frequency determined from dimensions of the divided internal gas chambers, a sound pressure in a space amplified by sound resonance brings about enhancement of the vibration of the surface plate part, which is problematic. However, according to the above-described configuration, because the dimensions of one divided internal gas chamber are decreased by the partitioning into the plurality of divided internal gas chambers, which can bring about the shifting of the resonant frequency to a higher frequency side, it becomes possible to reduce solid-borne sound in the broader frequency range.

Still further, a third feature of the solid-borne sound reducing structure according to the present invention is that at least a part of the surface plate part disposed so as to cover the plurality of divided internal gas chambers adjoining over the partition wall part to each other is separately formed at a location supported by the partition wall part.

According to this configuration, the vibration of the surface plate part located on one of the divided internal gas chambers is prevented from propagating to the surface plate part located over other adjoining the divided internal gas chambers. Accordingly, solid-borne sound can be reduced in the broader frequency range with higher stability.

Moreover, a fourth feature of the solid-borne sound reducing structure according to the present invention is to further comprise a column part which is disposed on the surface of the structure to support the surface plate part.

According to this configuration, because it becomes possible that the vibration distribution which could be generated on the surface plate part is narrowed at a lower cost in the simpler structure as compared with the case where the surface plate part is supported by the partition wall part, a more significant solid-borne sound reducing effect can be attained. Further, resonance of the surface plate part can be prevented, and solid-borne sound can be reduced in the broader frequency range.

In addition, a fifth feature of the solid-borne sound reducing structure according to the present invention is that a box-shaped body formed by the surface plate part and the outer peripheral wall part is disposed on the surface of the structure.

According to this configuration, when it is necessary to adjacently provide a plurality of sections, because the surface plate part of adjacent sections can be readily isolated, a vibration of the surface plate part of one section can be more reliably suppressed from propagating to the surface plate part of the adjacent section, and solid-borne sound can be more stably reduced in the broader frequency range.

In addition, the surface plate part which is integrally vibrated with the surface of the structure can be mounted in an easier way, including a case where one section is formed.

Further, a sixth feature of the solid-borne sound reducing structure according to the present invention is that, in a junction between the surface plate part and the outer peripheral wall part, the partition wall part, and/or the column part, the wall parts and/or the column part are joined to the surface plate part in such a manner that a contact area of the surface plate part with the wall parts and/or the column part becomes smaller than a cross-sectional area of a body part of the wall parts and/or the column part.

According to this configuration, because resonance of the surface plate part can be suppressed by lowering a bending moment that acts on a periphery of the surface plate part, solid-borne sound can be further stably reduced in the broader frequency range.

Still further, a seventh feature of the solid-borne sound reducing structure according to the present invention is that the surface plate part is supported by the wall parts and/or the column part at intervals shorter than a half wavelength of a bending wave which propagates on the surface of the structure along the in-plane direction in a frequency band of noise to be reduced or shorter than a half wavelength of a standing wave resulting from the bending wave.

According to this configuration, because the interval between adjacent two support parts (between the wall parts, between the column parts, and/or between the wall part and the column part when they are adjacent to each other) is shorter than the half wavelength of the bending wave or shorter than the half wavelength of the standing wave resulting from the bending wave, it can be avoided that the adjacent two wall and/or column parts are individually vibrated in opposite phase. In this manner, the vibration distribution of the surface plate part situated between the adjacent two wall and/or column parts can be restricted, so that solid-borne sound can be more stably reduced.

Furthermore, an eighth feature of the solid-borne sound reducing structure according to the present invention is that the surface plate part and the wall parts and/or the column part are formed in such a manner that a first-order resonance frequency of the surface plate part becomes higher than a frequency band of the noise to be reduced.

According to this configuration, it can be prevented that the surface plate part resonates in the frequency band of the noise to be reduced (a target frequency band), thereby allowing more reliable reduction of solid-borne sound.

In addition, a ninth feature of the solid-borne sound reducing structure according to the present invention is that the surface plate part and the wall parts and/or the column part are formed such that the surface plate part is supported by the wall and/or column parts at intervals shorter than the dimensions of the surface plate part which excite first-order resonance of the surface plate part in the frequency band of the noise to be reduced.

According to this configuration, the surface plate part can be prevented from resonating in the frequency band of the noise to be reduced (the target frequency band) by supporting the surface plate part at the intervals shorter than the dimensions which could cause the surface plate part to resonate in the target frequency band. As a result, solid-borne sound can be more reliably reduced.

Further, a tenth feature of the solid-borne sound reducing structure according to the present invention is that the surface plate part and the wall parts and/or the column part are formed in such a manner that the frequency band of the noise to be reduced is entirely contained in a frequency band between one resonance frequency of the surface plate part and another resonance frequency of the next higher order than the one resonance frequency.

According to this configuration, because the target frequency band does not cross the resonance frequencies of the surface plate part, resonance of the surface plate part in the target frequency band can be prevented, and it is also possible to use an effective solid-borne sound reducing characteristic introduced between the one resonance frequency and the resonance frequency of the next higher order. In this case, when the surface plate part and the wall parts and/or the column part are formed such that, in particular, the target frequency band is situated in close proximity of an antiresonance point, solid-borne sound can be reduced more remarkably.

Moreover, an eleventh feature of the solid-borne sound reducing structure according to the present invention is that an interval between the surface of the structure and the surface plate part is shorter than a half wavelength of a sound wave in the frequency band of the noise to be reduced.

According to this configuration, in the target frequency band, resonance of the sound wave between the surface of the structure and the surface plate part can be prevented, thereby allowing more reliable reduction of solid-borne sound.

In addition, a twelfth feature of the solid-borne sound reducing structure according to the present invention is that the surface plate part is supported by the wall and/or column parts at intervals shorter than the half wavelength of the sound wave in the frequency band of the noise to be reduced.

According to this configuration, because a distance between support parts (between the wall parts, between the column parts, and/or between the wall part and the column part when they are adjacent to each other) adjacent to each other in the in-plane direction of the surface of the structure is shorter than the half wavelength of the sound wave in the target frequency band, resonance of the sound wave can be prevented from occurring between the adjacent support parts (between the wall parts, between the column parts, and/or between the wall part and the column part when they are adjacent to each other). Consequently, solid-borne sound can be reduced with greater reliability in the target frequency band.

Further, a thirteenth feature of the solid-borne sound reducing structure according to the present invention is to dispose a vibration damping material on the surface plate part.

According to this configuration, because vibrational energy is consumed in deformation of the vibration damping material, vibrations can be damped, so that resonance of the surface plate part can be suppressed, thereby allowing reduction of solid-borne sound in the broader frequency range.

Still further, a fourteenth feature of the solid-borne sound reducing structure according to the present invention is that the vibration damping material is disposed in the vicinity of a joint part of the surface plate part with the wall and/or column parts so as to be joined to the surface plate part and the wall and/or column parts.

According to this configuration, when the surface plate part is caused to vibrate due to vibration of the structure, the vibration damping material is compressed or stretched between the surface plate part and the wall and/or column parts, or receives a shearing force, to thereby become deformed. Then, as compared with a case where the vibration damping material is installed at a location where it is only joined to the surface plate part, because a proportion of a deformation volume of the vibration damping material relative to a deformation volume of the surface plate part can be increased, more significant damping of the vibration of the surface plate part can be realized.

Moreover, a fifteenth feature of the solid-borne sound reducing structure according to the present invention is multilayer configuration which further includes one or more partition plates disposed between the surface of the structure and the surface plate part.

According to this configuration, an acoustic radiation efficiency of the surface plate part can be further significantly reduced in the broader frequency range. Therefore, solid-borne sound can be further greatly reduced in the broader frequency range.

In addition, a sixteenth feature of the solid-borne sound reducing structure according to the present invention is that a sound absorbing material is installed between the surface of the structure and the surface plate part.

According to this configuration, it can be suppressed that the sound pressure amplified by sound resonance in the internal gas chamber enhances the vibration of the surface plate part.

BRIEF DESCRIPTION OF THE DRAWINGS

showing

showing

showing

showing

showing

DESCRIPTION OF REFERENCE SYMBOLS

Figure 1:
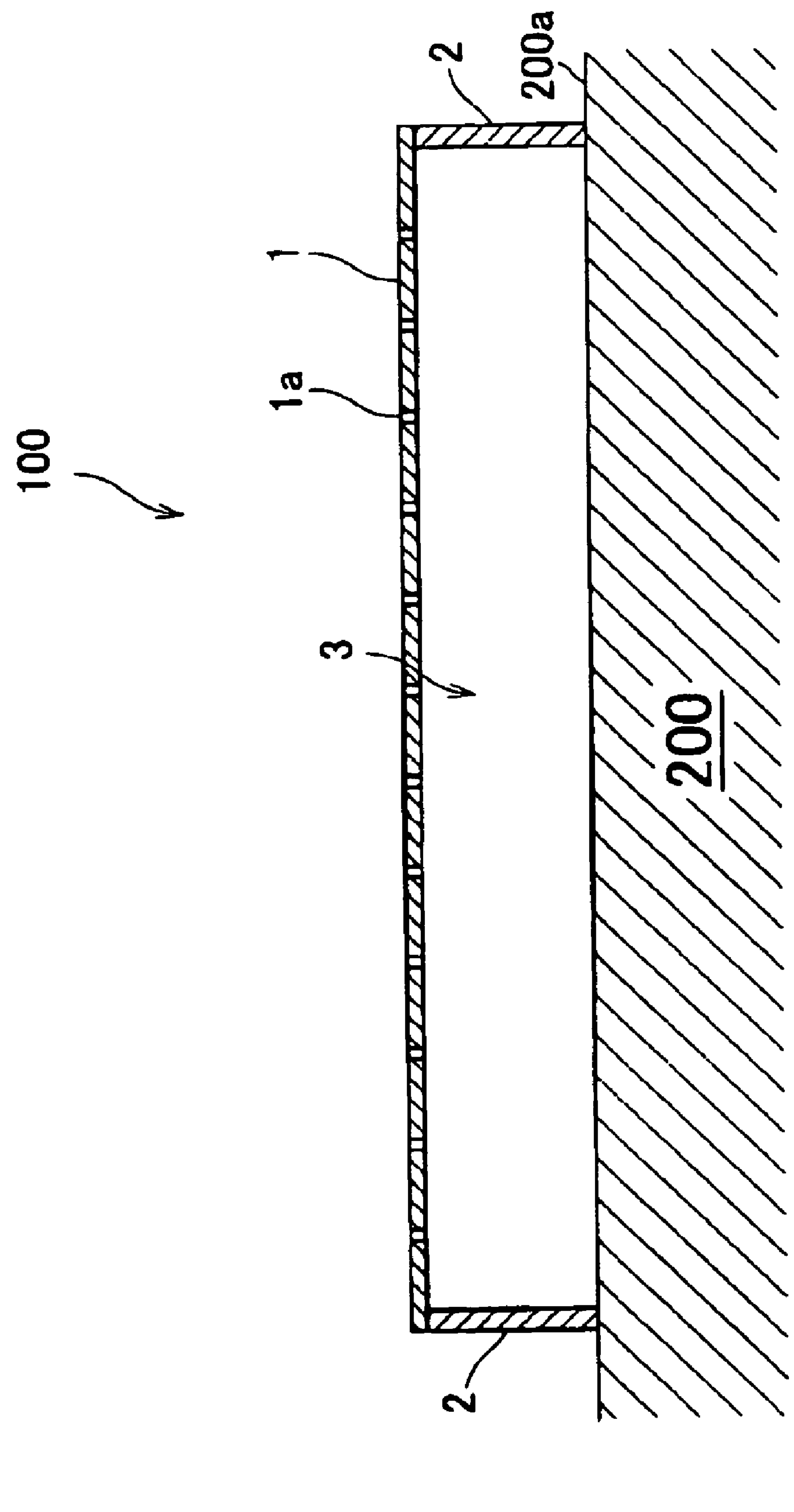
FIG. 1 is a schematic cross-sectional view showing a solid-borne sound reducing structure according to a first embodiment of the present invention.

1 perforated plate (surface plate part)
1*a* perforation hole (gas ventilating part)
2 frame member (wall part)
3 internal gas chamber
3*a*, 3*b*, 3*c* divided internal gas chamber
11, 21 surface plate part
12 outer peripheral wall part
13 partition wall part
22 wall part
23 partition plate
30 vibration damping material
40 sound absorbing material
60 column part
70 box-shaped body
71, 72 support member
71*a*, 72*b* vertex part
100~109, 440 solid-borne sound reducing structure
200~206 noise radiating structure
300 compressor

BEST MODE TO CARRY OUT THE INVENTION

Next, best modes to carry out the present invention will be described with reference to drawings.

First Embodiment

FIG. 1 shows a schematic cross-sectional view of a first embodiment of a solid-borne sound reducing structure according to the present invention, which is mounted on a surface of a structure (such as a driver device that functions while vibrating, piping vibrated by the passage of fluid, or a duct) which radiates noise while vibrating.

The solid-borne sound reducing structure 100 comprises a perforated plate 1 (a surface plate part) and frame members 2 (outer peripheral wall part) for supporting the perforated plate 1.

The perforated plate 1 includes a plurality of perforation holes 1*a* (gas ventilating part) that allow gas to pass through in a thickness direction of the perforated plate 1 (a vertical direction in the drawing). The perforation holes 1*a* are substantially uniformly distributed all over the perforated plate 1. The perforated plate 1 is supported so as to cover a vibration plane 200*a*, which is a surface of a structure 200 that vibrates and accordingly radiates noise, by the frame members 2 on the vibration plane 200*a*. In addition, the perforation holes 1*a* are not limited to the situation where they are uniformly distributed all over the perforated plate 1, and may be disposed in a partially localized way.

The frame members 2 are composed of a material having high stiffness, for example, a metallic material such as aluminum, a plastic, or the like, and support the perforated plate 1 in such a manner that the perforated plate 1 is forced to vibrate integrally with the vibration surface 200*a* by the vibration of the structure 200. In other words, the perforated plate 1 is supported by the frame members 2, so as to vibrate with/in an amplitude/phase substantially identical to an amplitude/phase of vibration of the vibration plane 200*a*. Further, the frame members 2 continuously support the perforated plate 1 to cover the entire perimeter of the perforated plate 1. Namely, the frame members 2 are formed so as to isolate a space between the vibration plane 200*a* and the perforated plate 1 from the outside in an in-plane direction of the vibration plane 200*a*. In this manner, the frame members 2 form an internal gas chamber 3 which is a sealed space other than paths passing through the perforation holes 1*a* between the vibration plane 200*a* and the perforated plate 1.

When the structure 200 vibrates, the whole area of the perforated plate 1 is almost uniformly vibrated via the frame members 2 together with the vibration plane 200*a*. At this time, because the perforation holes 1*a* are formed in the perforated plate 1, acoustic radiation efficiency (conversion efficiency from vibration to sound) is decreased. As a result of such decrease in the acoustic radiation efficiency of the perforated plate 1, radiation sound from the perforated plate 1 becomes smaller than sound radiated from the structure 200 before the installation of the solid-borne sound reducing structure 100 (before taking measures):

Further, in a state where the solid-borne sound reducing structure 100 is installed on the vibration plane 200*a* of the structure (after taking measures), the radiation sound radiated from the vibration plane 200*a* into the internal gas chamber 3 is suppressed by the perforated plate 1 from leaking to the outside toward a direction perpendicular to the vibration plane 200*a*, and sound that propagates from the internal gas chamber 3 toward a direction along the vibration plane 200*a* to the outside is also blocked by the frame members 2 which are disposed so as to isolate the space between the vibration plane 200*a* and the perforated plate 1 from the outside. In this manner, the radiation sound radiated from the vibration plane 200*a* into the internal gas chamber 3 can be suppressed from leaking to surroundings. As a consequent of matters stated above, it is possible to reduce the sound radiated from the vibrating structure to the surroundings (solid-borne sound).

On the other hand, because the above-described structure has simple configuration partitioned between the vibration plane 200*a* and the perforated plate 1 by the frame members 2, the cost of manufacturing the solid-borne sound reducing structure 100 can be lowered. Further, because of the configuration implemented without using an elastic member, less influences of aged deterioration is obtained, and durability can be improved.

Figure 2:
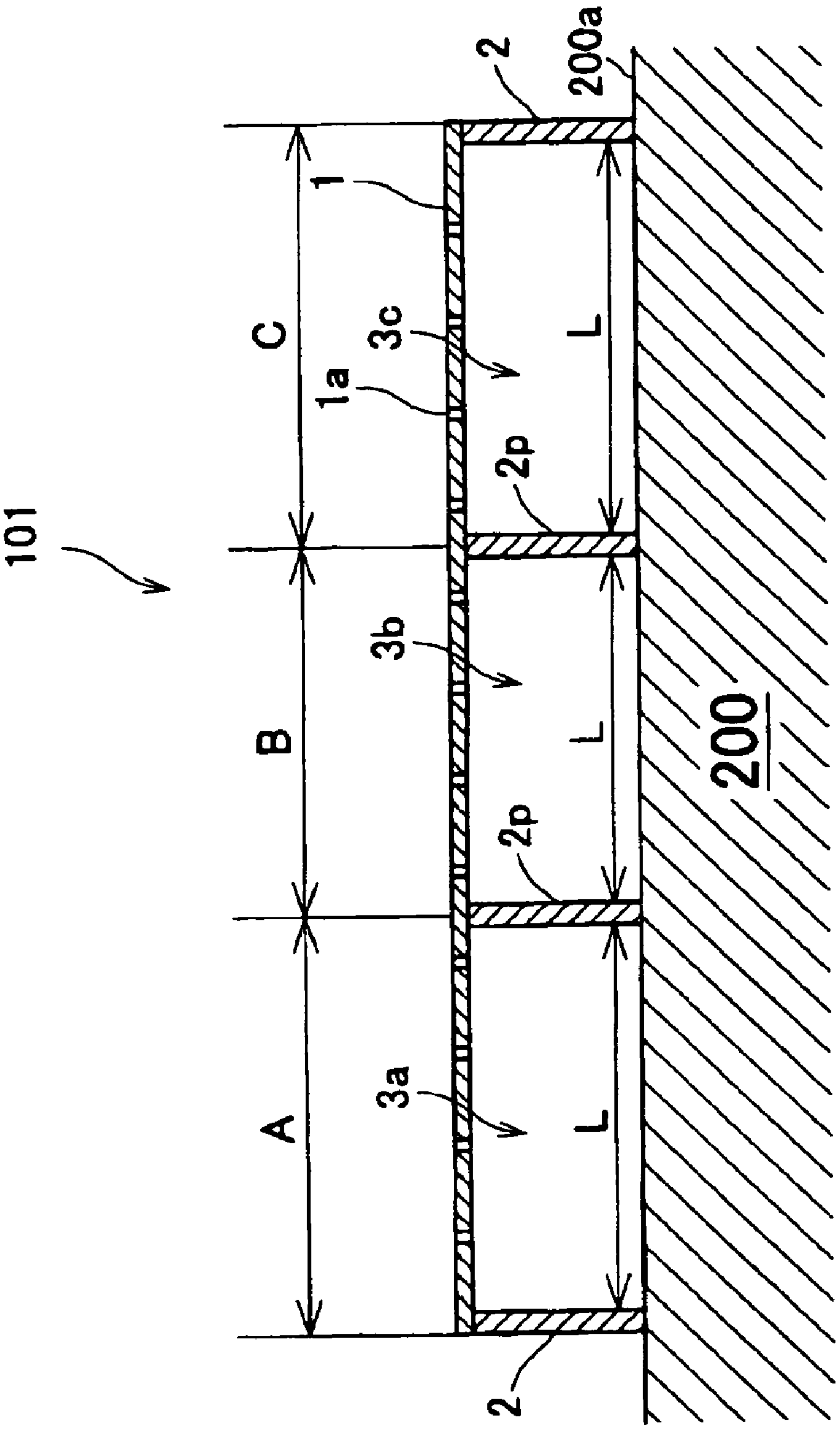
FIG. 2 is a schematic cross-sectional view showing a modification example of the solid-borne sound reducing structure shown in FIG. 1.

Then, a modification example of the first embodiment is shown in FIG. 2. This modification example is configured by further comprising frame members 2*p* (partition wall part) which are disposed on the surface of the structure 200 for supporting the perforated plate 1, and partitioning the internal gas chamber 3 in the in-plane direction of the surface of the structure 200 to form a plurality of divided internal gas chambers 3*a*, 3*b*, and 3*c*. In other words, the perforated plate 1 is not only supported at its outer peripheral edges by the frame members 2, but also supported at its intermediate portions in the in-plane direction by the frame members 2*p*. Moreover, the divided internal gas chambers 3*a*, 3*b*, and 3*c* are formed so as to respectively constitute closed spaces other than the passages passing through the perforation holes 1*a*, as in the case with the internal gas chamber 3 shown in FIG. 1.

When the perforated plate 1 is supported at a plurality of locations by the frame members 2 and the frame members 2*p* as described above, intervals at which the perforated plate 1 is supported by the frame members 2 and 2*p* become shorter. Therefore, even in a case where the vibration of the structure 200 is not totally uniform across the entire vibration plane 200*a*, i.e. even at the occurrence of a vibration distribution, for example, in which the amplitude/phase of vibration partially varies in the in-plane direction of the vibration plane 200*a*, the vibration of the perforated plate 1 can be brought close to uniformity in terms of the amplitude/phase (having no vibration distribution) in regions each constituting a top surface of the divided internal gas chambers 3*a*, 3*b*, or 3*c* (the individual regions indicated as A, B, and C in FIG. 2). Moreover, it has been proved that the solid-borne sound reducing effect is degraded when the perforated plate 1 has the vibration distribution along the in-plane direction in a region constituting the top surface of one of the divided internal gas chambers. With this in view, generation of the vibration distribution on the perforated plate 1 is inhibited as described above, so that solid-borne sound can be more stably reduced.

On the other hand, also in a case where the whole area of the vibration plane 200*a* uniformly vibrates with the same amplitude in the same phase, there is a possibility that the perforated plate 1 exhibits the vibration distribution generated in the in-plane direction when the perforated plate 1 is supported only at its peripheral edges by the frame members 2 (or example, when the structure shown in FIG. 1 is employed). For this reason, when the perforated plate 1 is additionally supported in the vicinity of its central area by the frame members 2*p*, because the perforated plate 1 and the structure 200 can be more integrally vibrated, the perforated plate 1 can be prevented from having the vibration distribution along the in-plane direction, to thereby facilitate uniform vibration across the whole area. From this fact, it becomes possible that solid-borne sound is more stably reduced.

Furthermore, because support intervals L (support spans) at which the perforated plate 1 is supported by the frame members 2 and frame members 2*p* are shortened as described above, a resonance frequency of the perforated plate 1 can be shifted to a higher frequency side. Accordingly, when the perforated plate 1 is installed on a machine (the structure), a piping system (the structure), or the like with the support spans which are designed in such a manner that the resonance frequency of the perforated plate 1 falls outside the range of a frequency band of the noise to be reduced (the target frequency band), for example, designed in such a manner that the resonance frequency of the perforated plate 1 is deviated from a characteristic frequency of the machine, a resonance frequency of the piping, or the like, it becomes possible to prevent the resonance of the perforated plate 1, and reduce the solid-borne sound to be radiated from the machine, the piping, or the like to the surroundings.

Further, there is another possibility that sound resonance occurs in a specific frequency determined from the dimensions of the closed space (the internal gas chamber 3) in the solid-borne sound reducing structure 100, and the vibration of the perforated plate 1 is enhanced by a sound pressure in the space amplified by the sound resonance. However, as shown in the modification example (refer to FIG. 2), because external dimensions of the closed space (the divided internal gas chambers 3*a*, 3*b*, 3*c*) in the solid-borne sound reducing structure 101 are downsized by partitioning the space into the plurality of the divided internal gas chambers 3*a*, 3*b*, and 3*c*, to thereby allow a shift of the resonance frequency to the higher frequency side, and resonance can be consequently avoided.

Note that the gas ventilating part formed in the surface plate part is not limited to the perforation hole 1*a* as described in this embodiment, and may be established as a slit formed on the surface plate part. In this case, the gas ventilating part having a large gas ventilating area can be readily produced, and adjustment of porosity can be facilitated.

Figure 3:
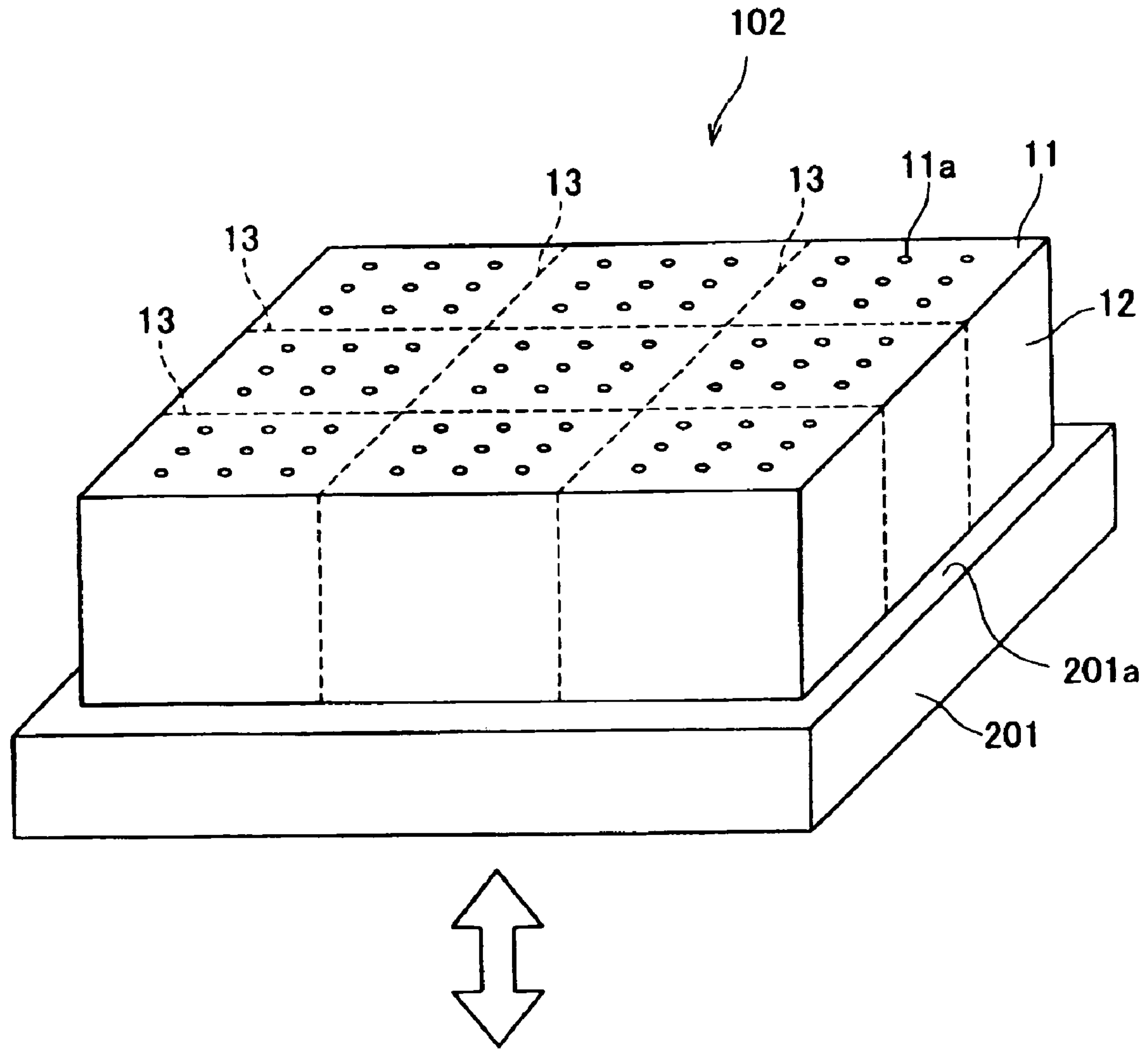
FIG. 3 is a schematic diagram of a solid-borne sound reducing structure used in an experiment.
Figure 4:
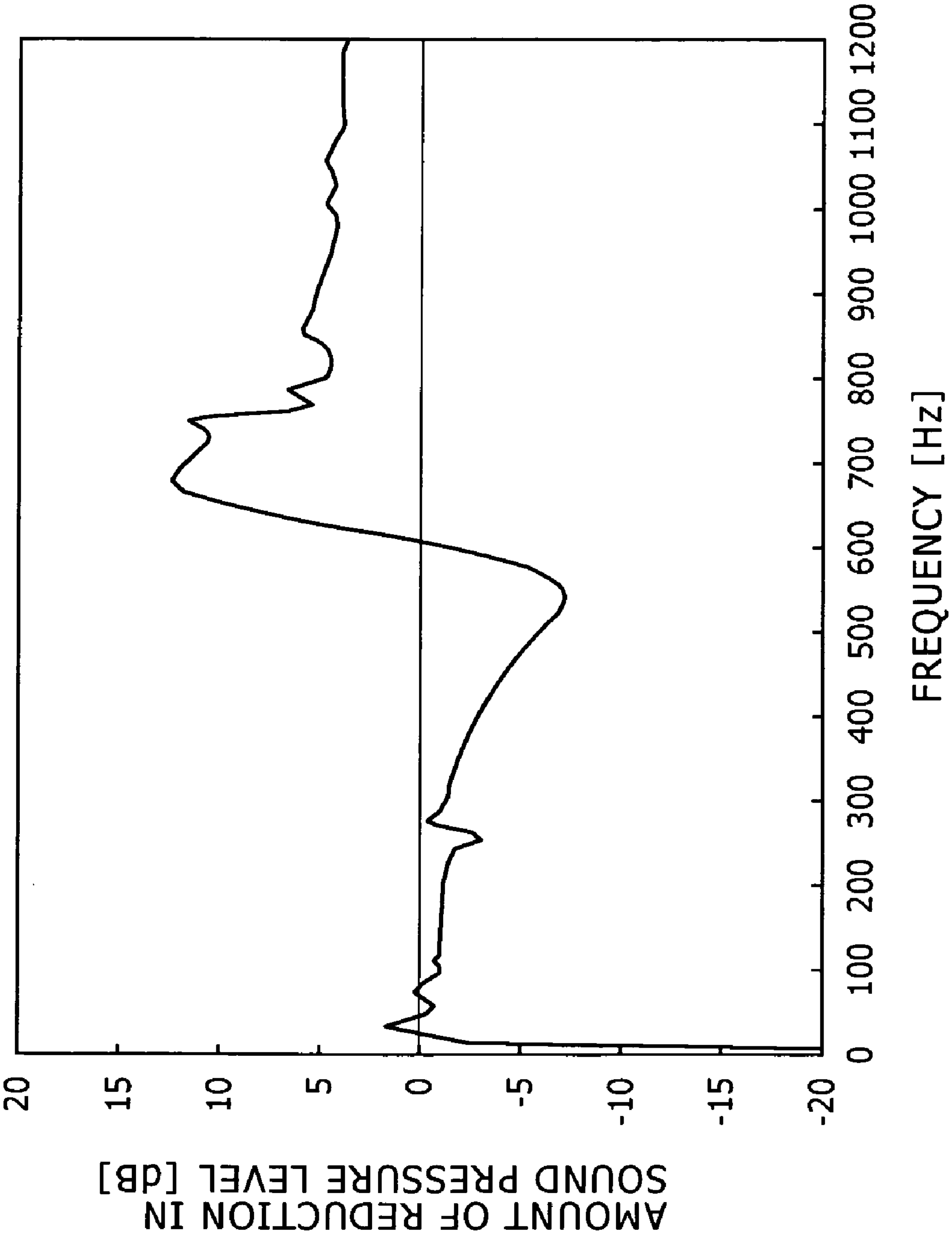
FIG. 4 is a graph showing a relationship between vibration frequencies and amounts of reduction in sound pressure level obtained in the experiment.

Next, based on experimental data, specific effects of the present invention will be described. In FIG. 3, a schematic diagram of a solid-borne sound reducing structure 102 used in the experiment is illustrated. FIG. 4 is a graph showing a relationship between vibration frequencies of a noise radiating structure and the amounts of reduction in sound pressure level obtained by the experiment.

In the experiment, an aluminum plate of a 20 mm in thickness was used as a vibrating structure 201 that radiates noise. Further, the solid-borne sound reducing structure 102 installed on a vibration plane 201*a* of the vibrating structure 201 was constructed by partitioning a space between the surface plate part 11 and the vibrating structure 201 to form vertical 3 and horizontal 3, a total of 9 divided internal gas chambers. It should be noted that, one divided internal gas chamber is a space partitioned in a lattice pattern so as to have a transverse dimension of 45 mm and a longitudinal dimension of 30 mm in the in-plane direction, and a height of the divided internal gas chamber is 40 mm.

In addition, the solid-borne sound reducing structure 102 was formed as a configuration for covering the 9 divided internal gas chambers with one sheet of the surface plate part 11. As the surface plate part 11 of the solid-borne sound reducing structure 102, an aluminum plate of 2 mm in thickness was used, in which 9 (vertical 3×horizontal 3) perforation holes 11*a* having a hole diameter of 2 mm were formed for each section, and a total of 81 (9 holes×9 sections) perforation holes 11*a* were formed so that the porosity ((total hole area/total surface plate part area opposed to divided internal gas chamber)×100) was specified to 2%.

It should be noted that the above-described height of the divided internal gas chamber, hole diameter, porosity, and plate thickness were designed to realize a capability of reducing solid-borne sound at 600 Hz or higher.

Moreover, an aluminum plate of 6 mm in thickness was used as the outer peripheral wall part 12 for supporting the surface plate part 11 and constituting side faces of the solid-borne sound reducing structure 102, while an aluminum plate of 3 mm in thickness was used as the partition wall part 13 for partitioning the inside of the solid-borne sound reducing structure 102 surrounded by the outer peripheral wall part 12.

In the experiment, the vibrating structure 201 was vibrated along a thickness direction of the vibrating structure 201 (a direction indicated by an arrow in FIG. 3) at a predetermined frequency by means of a vibration generator (not illustrated). Then, a sound pressure level above the surface plate part 11 was measured by a microphone, and a difference between the measured sound pressure level and a sound pressure level measured under the same conditions other than the solid-borne sound reducing structure 102 was not installed was calculated (the amount of reduction in sound pressure level). Note that a measurement point was set to a location which was 10 mm away from the center of the in-plane direction of the surface plate part 11 toward an opposite side of the vibrating structure 201 when the solid-borne sound reducing structure 102 was installed (after taking measures), and set to a location which was 10 mm upwardly away from the vibration plane 201*a* when the solid-borne sound reducing structure 102 was not installed (before taking measures).

As can be seen from an experimental result shown in FIG. 4, the amount of reduction in sound pressure level becomes positive at 600 Hz or higher, and a particular rise of the amount of reduction in sound pressure level is observed from 650 Hz to 750 Hz. Therefore, it was verified that a greater effect of solid-born sound reduction is obtained at 600 Hz or higher as designed.

It is to be noted that both a frequency band in which the effect of solid-borne sound reduction can be obtained and an amount of the effect of solid-borne sound reduction (the amount of reduction in sound pressure level) can be adjusted depending on the frequency of noise to be reduced (the target frequency) or loudness of the noise by changing the heights of the outer peripheral wall part 12 and the partition wall part 13, the plate thickness of the surface plate part 11, the hole diameter, and the porosity. For example, in this experiment, an adjustment can be performed in such a manner that, the heights of the outer peripheral wall part 12 and the partition wall part 13, the plate thickness of the surface plate part 11, the hole diameter, and the porosity are changed, to thereby shift a region in which the amount of reduction in sound pressure level becomes positive (a reduction region) so that the target frequency is contained in the reduction region.

Next, an example of designing the solid-borne sound reducing structure according to a numerical analysis will be described.

ANALYSIS EXAMPLE 1

Figure 5:
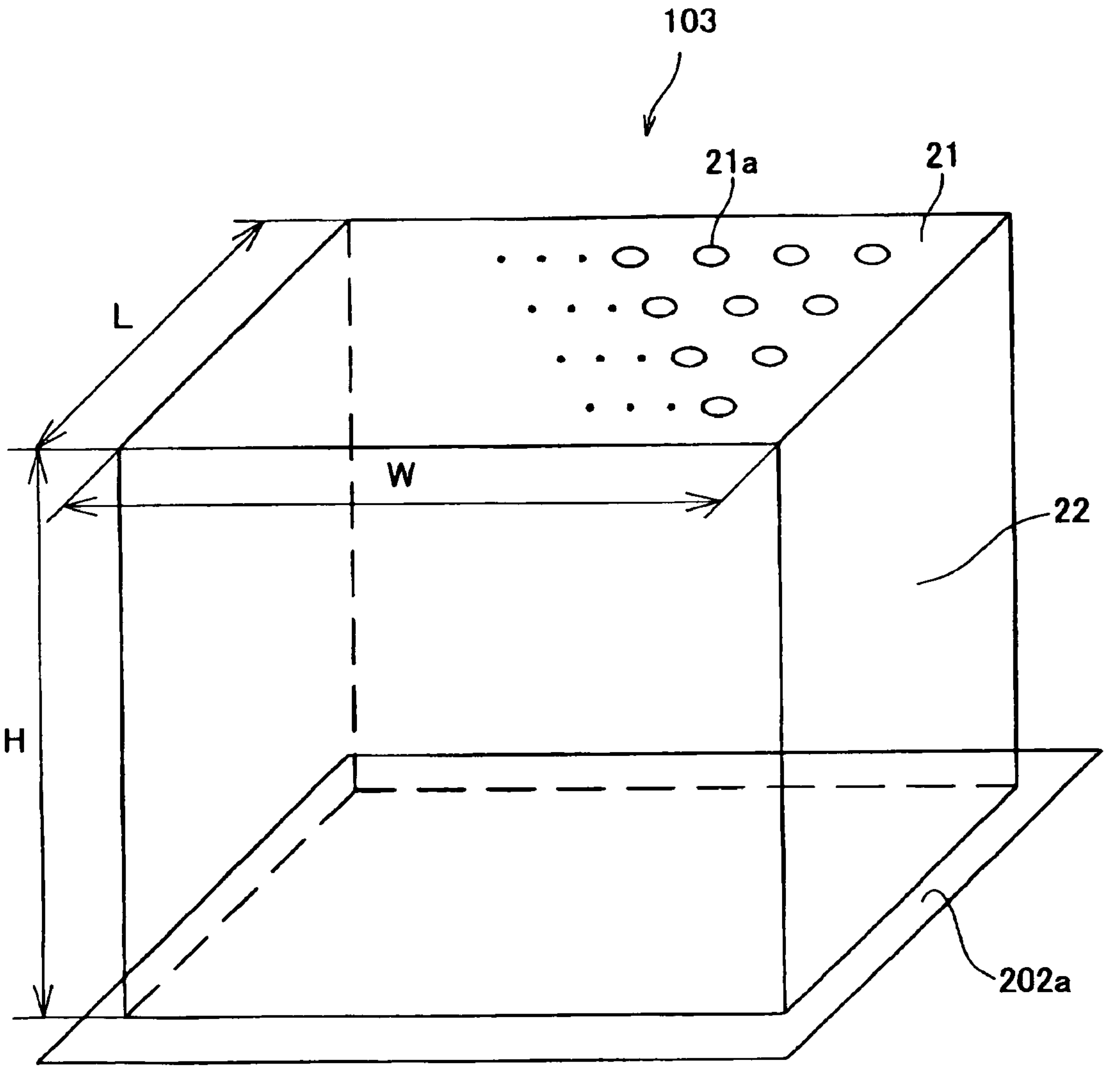
FIG. 5 is a diagram showing a numerical analysis model of the solid-borne sound reducing structure according to this invention.

A numerical analysis model in this analysis is shown in FIG. 5. In this analysis, an amount of reduction in acoustic radiation power from the surface of the surface plate part obtained by changing the hole diameter and porosity of the perforation holes 21*a* in the surface plate part 21 of a solid-borne sound reducing structure 103 was determine by calculation. Analysis conditions are described below. Here, the analysis was conducted assuming that a fixed number of the perforation holes 21*a* specified in the analysis conditions below were uniformly distributed on a top surface of the analysis model.

The analysis was conducted with a rectangular aluminum plate having a longitudinal dimension (L) defined to 35 mm, a transverse dimension (W) defined to 45 mm, and a width defined to 2 mm as the surface plate part 21, and with the hole diameters and porosities of the perforation holes 21*a* penetrating through the surface plate part 21 which were changed according to 5 conditions listed in Table 1. It was further assumed that the wall part 22 connected the entire perimeter of the surface plate part 21 with the vibration plane 202*a* so as to obtain 40 mm as the height (H) from the vibration surface 202*a* of the noise radiating structure to the surface plate part 21. Still further, air was taken as a medium for transferring a sound wave.

Note that the numerical analysis was conducted using a plate-sound field coupled analysis in which a finite element method was applied to the plate part while a boundary element method was applied to a sound field.

TABLE 1

| Condition | 1 | 2 | 3 | 4 | 5 |
|---|---|---|---|---|---|
| Hole Diameter (mm) | 0.25 | 0.5 | 1 | 2 | 4 |
| Number of Holes (pieces) | 413 | 110 | 29 | 9 | 3 |
| Porosity (%) | 1.5 | 1.6 | 1.7 | 2 | 2.9 |

Acoustic radiation power from the surface of the surface plate part 21 in accordance with the conditions listed on Table 1 to be obtained when a forced vibration is exerted at 1 m/s along a height (H) direction on the vibration surface 202*a* and peripheral 4 sides of the surface plate part 21 connected through the wall part 22 to the structure was calculated with respect for each condition.

Figure 6:
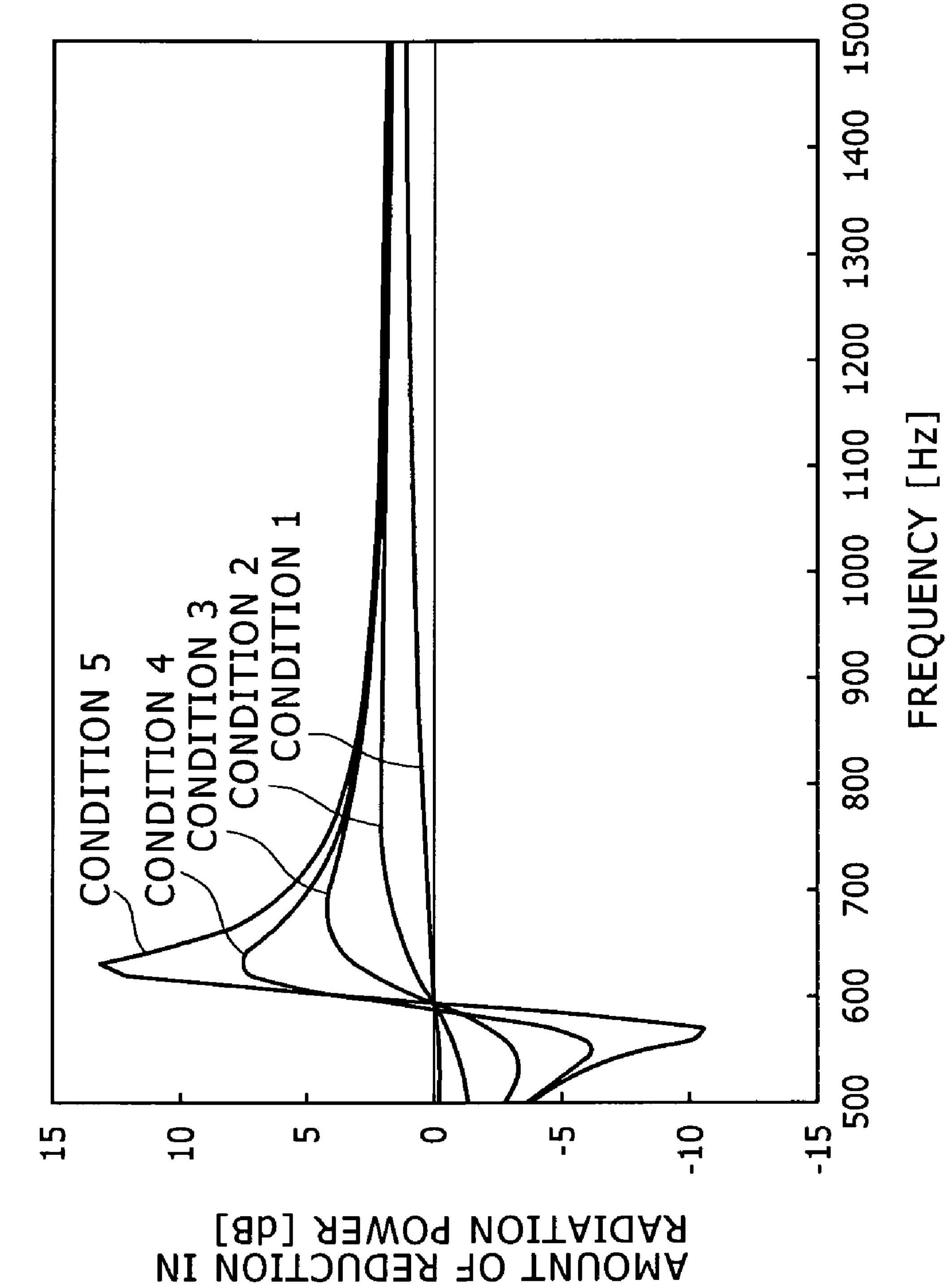
FIG. 6 is a graph showing analysis results in analysis example 1.

Results of the numerical analysis are shown in FIG. 6. The amounts of reduction in radiation power plotted on an ordinate axis are increments or decrements of acoustic radiation power calculated relative to acoustic radiation power from the vibration plane 202*a* (of a portion equivalent to the area of the surface plate part 21) on which the solid-borne sound reducing structure 103 is not installed. In addition, the conditions 1 to 5 indicated in FIG. 6 are associated with the design conditions for the surface plate part 21 listed on Table 1.

As shown in FIG. 6, effects are obtained in a frequency band from 600 Hz or higher, and maximum values of the amounts of reduction in acoustic radiation power become greater as the hole diameter increases or as the porosity increases. On the other hand, in a frequency band from 600 Hz or lower, the amounts of reduction in acoustic radiation power are negative, and the acoustic radiation power becomes higher as the hole diameter increases or as the porosity increases on the conditions of this analysis.

When the solid-borne sound reducing structure is designed so as to obtain the effect of solid-borne sound reduction in the frequency band from 600 Hz or higher as described above, it is also possible to variously change the amount of reduction in acoustic radiation power by modifying the design conditions for the surface plate part 21.

ANALYSIS EXAMPLE 2

Figure 7:
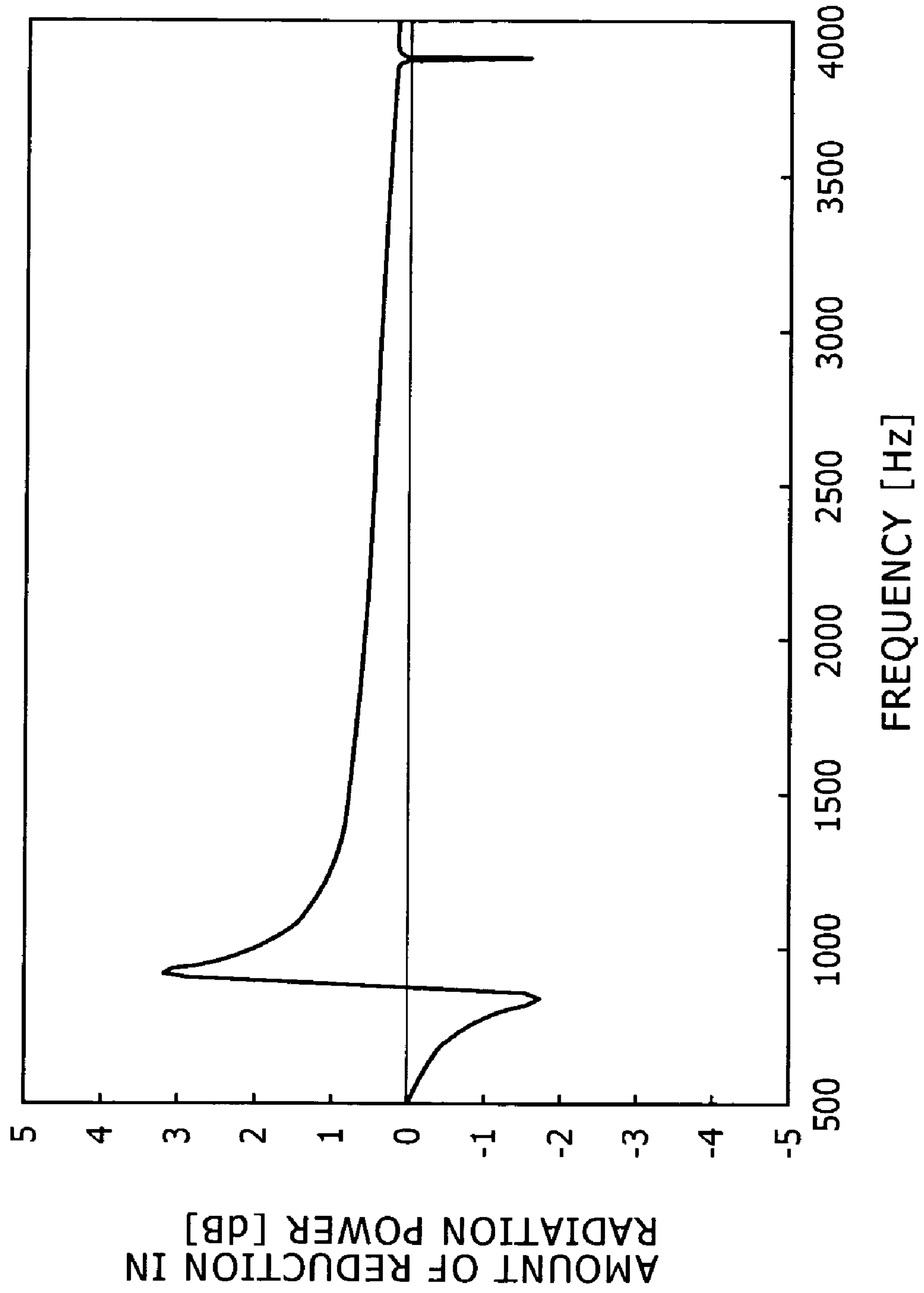
FIG. 7 is a graph showing analysis results in analysis example 2.

FIG. 7 shows analysis results obtained by changing the hole diameter of the surface plate part 21 to 2 mm, the porosity to 1.3%, and the height (H) of the wall part 22 to 12 mm in the analysis conditions of Analysis Example 1.

As shown in FIG. 7, by modifying the design conditions for the surface plate part 21 and the wall part 22, the effect of solid-borne sound reduction can be obtained in a frequency band from 900 Hz or higher, and the peak frequency for exerting the effect of solid-borne sound reduction, which was in a range of from approximately 600~700 Hz in Analysis Example 1, can be shifted to regions around 900 Hz.

On the other hand, acoustic radiation power becomes higher (the amount of reduction in radiation power is decreased) in the vicinity of 3800 Hz, which is caused by the occurrence of resonance of a sound wave in the internal gas chamber due to a fact that the length W (45 mm) of the inner gas camber surrounded by the wall parts 22 coincides with a half wavelength of the sound wave at 3800 Hz.

Thus, for example, in the solid-borne sound reducing structure 101 shown in FIG. 2, aluminum plates used as the partition wall parts 2*p* may be disposed to partition a space between the surface of the structure 200 and the perforated plate 1 at intervals shorter than the half wavelength of a sound wave that passes through the divided internal gas chambers 3*a*, 3*b*, and 3*c* in the target frequency band, to thereby allow prevention of resonance of the sound wave between the adjacent partition wall parts 2*p*, with a result that solid-borne sound can be more reliably reduced. In this connection, it is preferable that the intervals between the partition wall parts 2*p* are smaller than ½ of the wavelength of the sound wave and greater than or equal to 1/32 of the wavelength. When the intervals between the partition wall parts 2*p* are defined as being greater than or equal to 1/32 of the wavelength of the sound wave, an excessive increase in number of partition wall parts 2*p* can be prevented, to thereby suppress the possibility that a capacity of the space (the divided internal gas chamber) needed to attain the effect of solid-borne sound reduction is downsized by the volume of the inner wall parts 2*p* (a capacity occupied by the partition wall parts 2*p*).

In addition, the resonance of the sound wave in the internal gas chamber could also occur when the distance between the vibration plane 200*a* of the structure 200 shown in FIG. 2 and the perforated plate 1 coincides with the half wavelength of the sound wave. Therefore, when an interval between the vibration plane 200*a* and the perforated plate 1 is designed so as to become shorter than the half wavelength of the sound wave that passes through the internal gas chamber 3 in the frequency band of the noise to be reduced, resonance of the sound wave that could occur between the vibration plane 200*a* and the perforated plate 1 in the target frequency band can be prevented, which allows more reliable reduction of solid-borne sound.

ANALYSIS EXAMPLE 3

Figure 8:
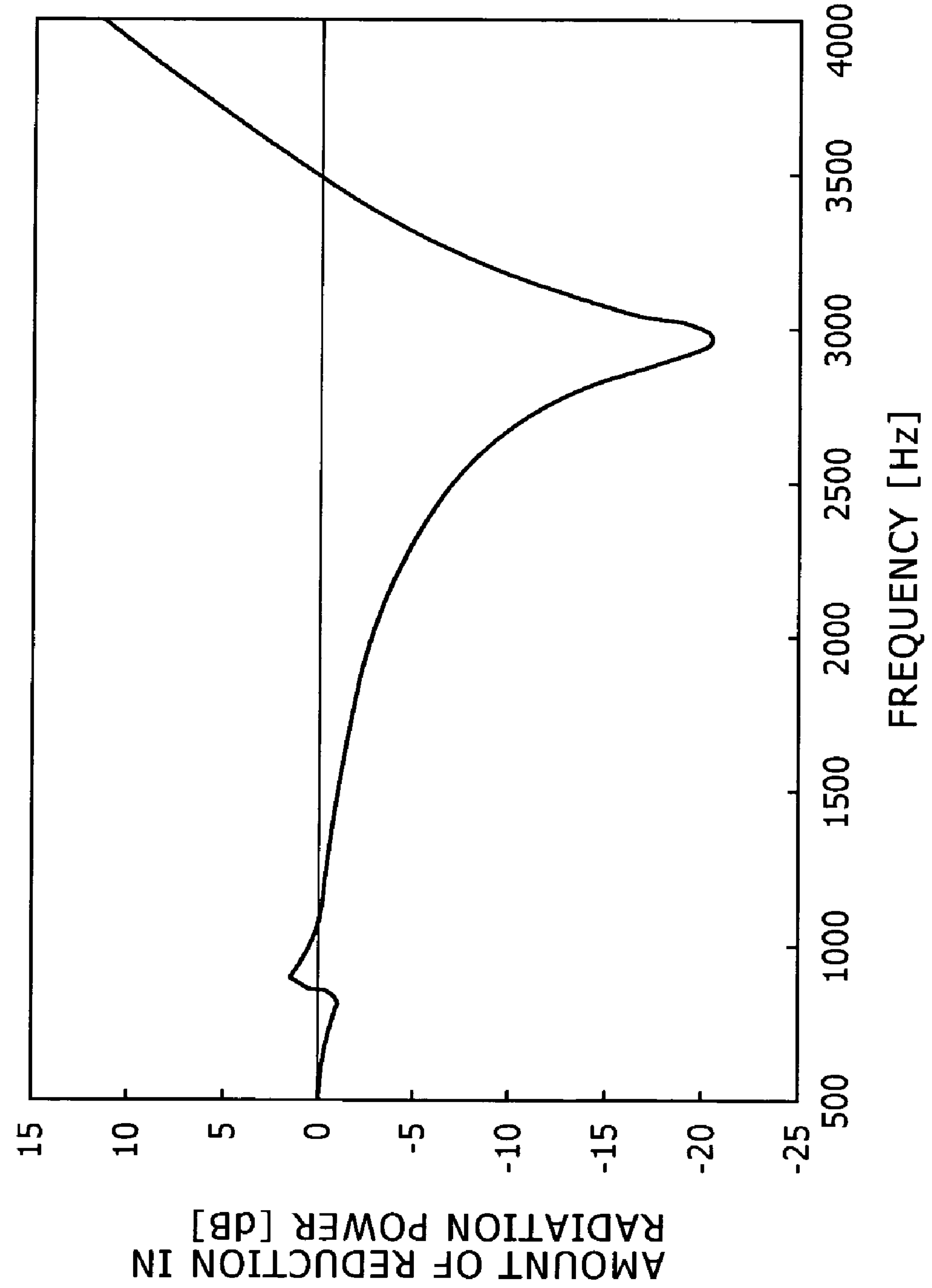
FIG. 8 is a graph showing analysis results in analysis example 3.

FIG. 8 shows results of a similar analysis conditions as Analysis Example 2 other than taking a Young's modulus of the material for the surface plate part 21 as 1/24 of a Young's modulus used in Analysis Example 2.

As shown in FIG. 8, at frequencies in the region of 3000 Hz, because of the occurrence of resonance of the surface plate part 21, the amount of reduction in radiation power is significantly dropped. Further, the amount of reduction in radiation power becomes negative in a frequency range of 1100~3500 Hz where the amount of reduction in radiation power had positive values in Analysis Example 2. From this fact, it is found that the radiation power is increased in a broad frequency band by the resonance of the surface plate part 21 as compared with a state where no solid-born sound reducing structure is installed.

On the other hand, in a frequency band from 3500 Hz or higher, which is higher than the first-order resonance frequency of 3000 Hz of the surface plate part 21, a greater effect of solid-borne sound reduction is exerted.

The first-order resonance frequency of the surface plate part 21 can be changed according to the shape, dimensions, material, and plate thickness of the surface plate part 21 and the shape, material, and other support conditions of the wall part 22.

Accordingly, when the shape, dimensions, material, and plate thickness of the surface plate part 21 and the shape, material, and other support conditions of the wall part 22 are designed to include the target frequency, which is a frequency at which the noise should be reduced, into a frequency band in which the amount of reduction in radiation power becomes positive within a frequency band from the first-order resonance frequency or higher, the surface plate part 21 can be prevented from resonating at the target frequency, to thereby allow the use of an effective solid-borne sound reducing characteristic obtained in the frequency band of the first-order resonance frequency or higher. As a result, solid-borne sound can be reduced with reliability.

Also, in the frequency band from the first-order resonance frequency or higher, because the resonance of the surface plate part 21 occurs upon arrival at a secondary resonance frequency, which again decreases the amount of reduction in radiation power (radiation power is increased by installing the solid-borne sound reducing structure), it is desirable to design the solid-borne sound reducing structure in such a manner that the target frequency is set to a frequency smaller than or equal to the secondary resonance frequency of the surface plate part 21.

In addition, the effective solid-borne sound reducing characteristic obtained in the frequency band between the first-order resonance frequency and the secondary resonance frequency as described above emerges between a certain resonance frequency and another resonance frequency of the next higher order than the certain resonance frequency, such as between the secondary resonance frequency and the third resonance frequency, between the third resonance frequency and fourth resonance frequency, and so on. Accordingly, for example, the solid-borne sound can be effectively reduced by designing the solid-borne sound reducing structure so as not to include the resonance frequencies in the target frequency band having a constant width. In particular, designing an antiresonance point existing between a certain resonance frequency and another resonance frequency of the next higher order than the certain resonance frequency to be contained in the target frequency band, can further remarkably enhance the effect of solid-borne sound reduction.

Further, as can be seen from the results of this analysis, because of the decreased Young's modulus of the surface plate part 21, the first-order resonance frequency of the surface plate part 21 is shifted to a lower frequency side as compared with Analysis Example 2. More specifically, the first-order resonance frequency of the surface plate part 21 is found to be 3000 Hz, and getting further closer to the frequency (900 Hz) which is indicated in Analysis Example 2 as a frequency at which the greater effect of solid-borne sound reduction is obtained. Thus, as has been described above, the greater effect of solid-borne sound reduction is exerted in the frequency band from 3500 Hz or higher, while the effect of solid-borne sound reduction is degraded in a region from 900 Hz or higher where the effect was remarkable in Analysis Example 2.

In this way, the resonance frequency of the surface plate part 21 varies depending on the shape, dimensions, material, and plate thickness of the surface plate part, the conditions supported by the wall part, and other conditions. Therefore, the solid-borne sound reducing structure capable of exerting the greater effect of solid-borne sound reduction on the target frequency can be designed by changing the above-described design conditions, to thereby adjust the resonance frequency to an optimum value so that the target frequency is contained in the frequency band in which the great effect of solid-borne sound reduction is obtained.

<Calculation of Resonance Frequency>

Here, when the surface plate part is rectangular or circular, a resonance frequency of the surface plate part can be calculated as will be described below from a theoretical equation for the resonance frequency (an exact solution or an approximate solution using a theoretical analysis) by determining the shape, dimensions, material, and plate thickness of the surface plate part, and the conditions for supporting the surface plate part by means of the wall part.

When the surface plate part is a rectangle with simply supported at peripheral four sides:

The resonance frequency "f" can be calculated using Equation 1. In Equation 1, "a" is a length of a short side, "b" is a length of a long side (a=b for a square), "i" is a degree along a short side direction, "j" is a degree along a long side direction (i=j=1 for the first-order resonance), "E" is a Young's modulus, "ν" is a Poisson ratio, "ρ" is a density, and "t" is a plate thickness.

[Equation 1]

$$f = \frac{\pi}{2}\left(\frac{i^2}{a^2} + \frac{i^2}{b^2}\right)\sqrt{\frac{D}{\rho t}}$$

$$D = \frac{Et^3}{12(1 - \nu^2)}$$

When the surface plate part is a rectangle with fixedly supported at peripheral four sides:

The resonance frequency "f" can be calculated using Equation 2. In Equation 2, "λ" is a degree, which is a constant determined from an aspect ratio (long side/short side), "a" is the length of the short side, "E" is the Young's modulus, "ν" is the Poisson ratio, "ρ" is the density, and "t" is the plate thickness.

[Equation 2]

$$f = \frac{\lambda^1}{2\pi a^2}\sqrt{\frac{D}{\rho t}}$$

$$D = \frac{Et^3}{12(1 - \nu^2)}$$

When the surface plate part is a circle:

The resonance frequency "f" can be calculated using Equation 3. In Equation 3, "λ" is the degree, which is a constant determined from periphery supporting conditions, "a" is a radius, "E" is the Young's modulus, "ν" is the Poisson ratio, "ρ" is the density, and "t" is the plate thickness.

[Equation 3]

$$f = \frac{\lambda^2}{2\pi a^2}\sqrt{\frac{D}{\rho t}}$$

$$D = \frac{Et^3}{12(1 - \nu^2)}$$

In case of specifications having theoretical equations other than those described above, it is convenient to calculate using the theoretical equations. In case of specifications without theoretical equations, the resonance frequency may be calculated using a numerical analysis such as a finite element method.

In this way, the design conditions for the surface plate part 21 and the wall part 22 are determined to obtain the first-order resonance frequency of the surface plate part 21 which is higher than the frequency band of the noise to be reduced using the above-described theoretical equations for the resonance frequency or the numerical analysis, and, according to the determined design conditions, the surface plate part 21 and the wall part 22 are formed. As a result, it becomes possible that the surface plate part 21 is prevented from resonating in the frequency band of the noise to be reduced (the target frequency band), and that the effect of solid-borne sound reduction in the region from 900 Hz or higher as shown in Analysis Example 2 is utilized in a broader frequency band, which can lead to reliable reduction of the solid-borne sound.

In addition, after the frequency of the noise to be reduced, the shape, material, and plate thickness of the surface plate part and the conditions for supporting the surface plate part by means of the wall part (except for the support span) are determined, dimensions of the surface plate part (a size per one section) with which the first-order resonance occurs on the surface plate part can be determined using the above-described theoretical equations for the resonance frequency or the numerical analysis. When the wall part supports the surface plate part at intervals shorter than the determined dimensions, the first-order resonance of the surface plate part can be avoided from occurring in the frequency of the noise to be reduced, and the solid-borne sound can be reduced with further higher reliability.

For example, when the peripheral four sides of each section are supported by a plate partitioned in a square pattern, the dimension "a" of one section of the surface plate part which causes the first-order resonance to occur at the frequency "f" can be found using Equation 4 which is further transformed from Equation 2 taking a=b and i=j=1.

[Equation 4]

$$a = \sqrt{\frac{\pi}{f}\sqrt{\frac{D}{\rho t}}}$$

Conversely, there may be a case where the solid-borne sound reducing structure should be formed so as to set the dimension "a" of one section at a predetermined dimension. In this case, the dimension of one section which will cause first-order resonance to occur on the surface plate part in the target frequency band is previously calculated using the above-described theoretical equations for resonance frequency or the numerical analysis while appropriately changing a combination of the shapes, materials, etc. of the surface plate part and the wall part, and the combination of the shapes, materials, etc. of the surface plate part and the wall part. The combination is selected as actual design conditions to set the calculated dimension longer than the predetermined dimension. Then, the surface plate part can be prevented from resonating in the frequency band of the noise to be reduced (the target frequency band) by forming the surface plate part and the wall part based on the actual design conditions, with a result that solid-borne sound can be reduced with greater reliability.

ANALYSIS EXAMPLE 4

Figure 9:
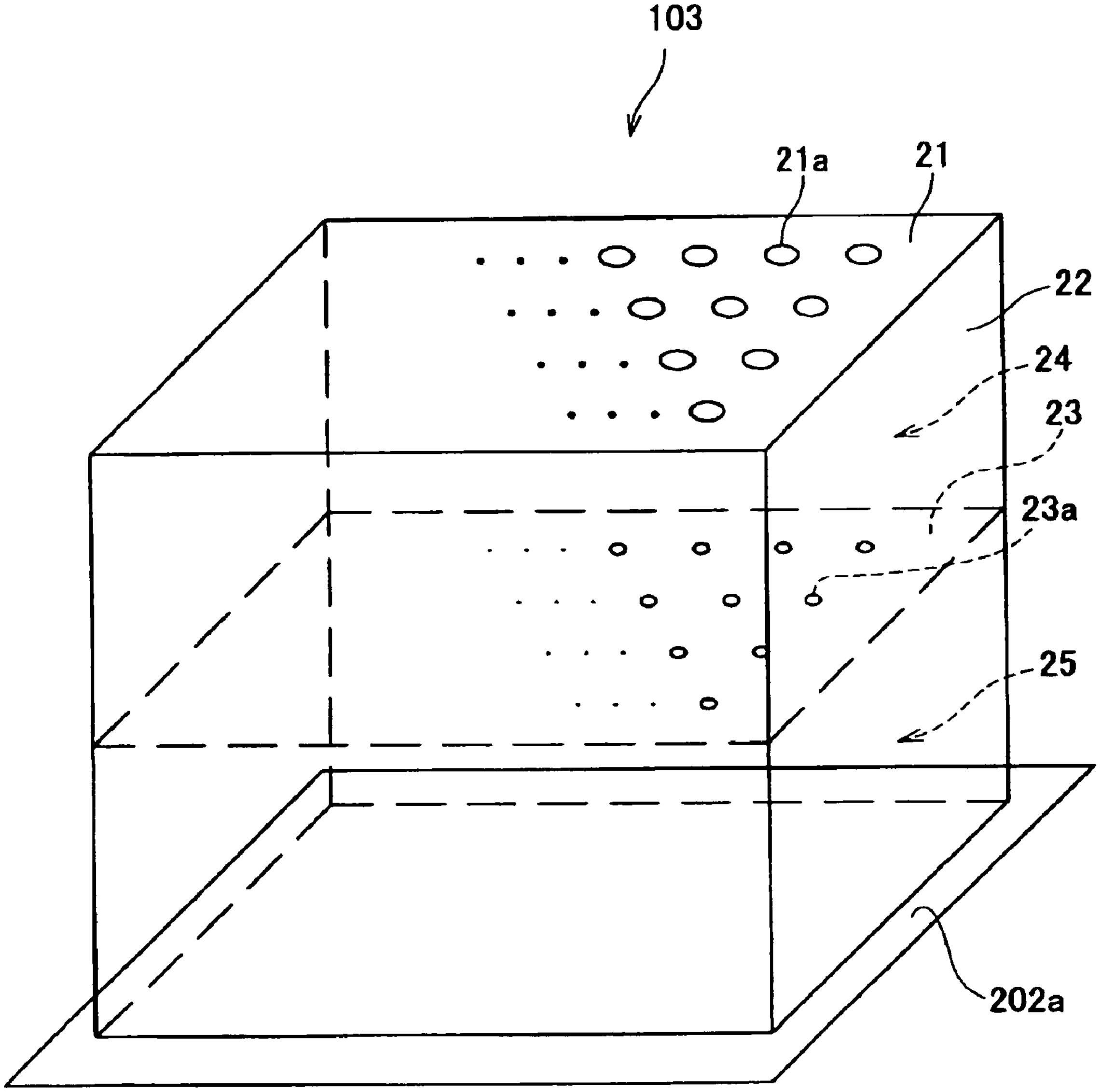
FIG. 9 is a diagram showing an analysis model in analysis example 4.

Next, an analysis model in Analysis Example 4 is shown in FIG. 9. In Analysis Example 4, an amount of reduction in acoustic radiation power was calculated with respect to a solid-borne sound reducing structure 103 of a multi-layer configuration obtained from the analysis model used in Analysis Example 1 (refer to FIG. 5) by disposing a partition plate 23 in the space between the vibration plane 202*a* of the structure and the surface plate part 21 to partition the space along a normal line direction of the vibration plane 202*a* and form two layers of internal gas chambers 24, 25. The partition plate 23, which is a perforated plate with the perforation holes 23*a* formed so as to be uniformly distributed, is formed with 0.1 mm as the plate thickness, with 0.4 mm as the hole diameter of the perforation holes 23*a*, with 22 as the number of holes, and with 0.2% as the porosity. The partition plate 23 is placed at a height of 20 mm above the vibration plate 202*a* so as to be situated in the middle between the vibration plane 202*a* and the surface plate part 21. On the other hand, the surface plate part 21 is formed with 1 mm as the hole diameter of the perforation holes 21*a*, with 29 as the number of holes, and with 1.7% as the porosity (in a shape identical to that under condition 3 in Analysis Example 1). Other conditions are similar to those of Analysis Example 1. Here, similarly with Analysis Example 1, the analysis was conducted assuming that the perforation holes 21*a* were uniformly distributed on the surface plate part 21.

Figure 10:
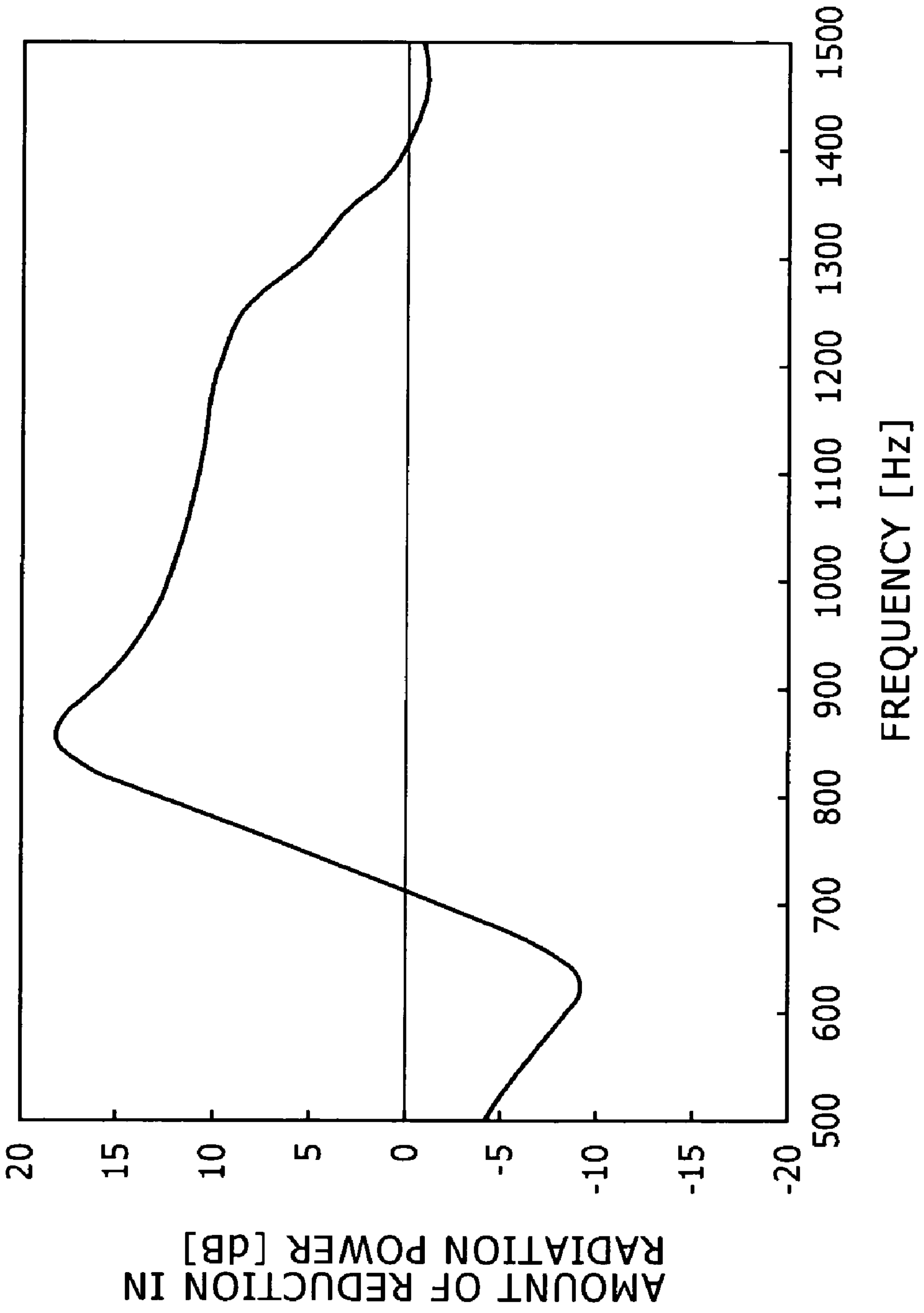
FIG. 10 is a graph showing analysis results in analysis example 4.

As analysis results are shown in FIG. 10, in this instance of the solid-borne sound reducing structure formed as the multi-layer configuration by the partition plate 23, the amount of reduction in radiation power exceeds 10 dB in a frequency range of from 800 Hz to 1100 Hz, where the greater effect of solid-borne sound reduction was exerted. On the other hand, in an instance of the structure from which the partition plate 23 is removed (the structure according to condition 3 in Analysis Example 1), the amount of reduction in radiation power is 5 dB or less at a maximum (refer to FIG. 6). From this fact, it is found that the acoustic radiation efficiency of the surface plate part can be significantly reduced in a further broader frequency range by employing the multi-layer configuration.

Figure 11:
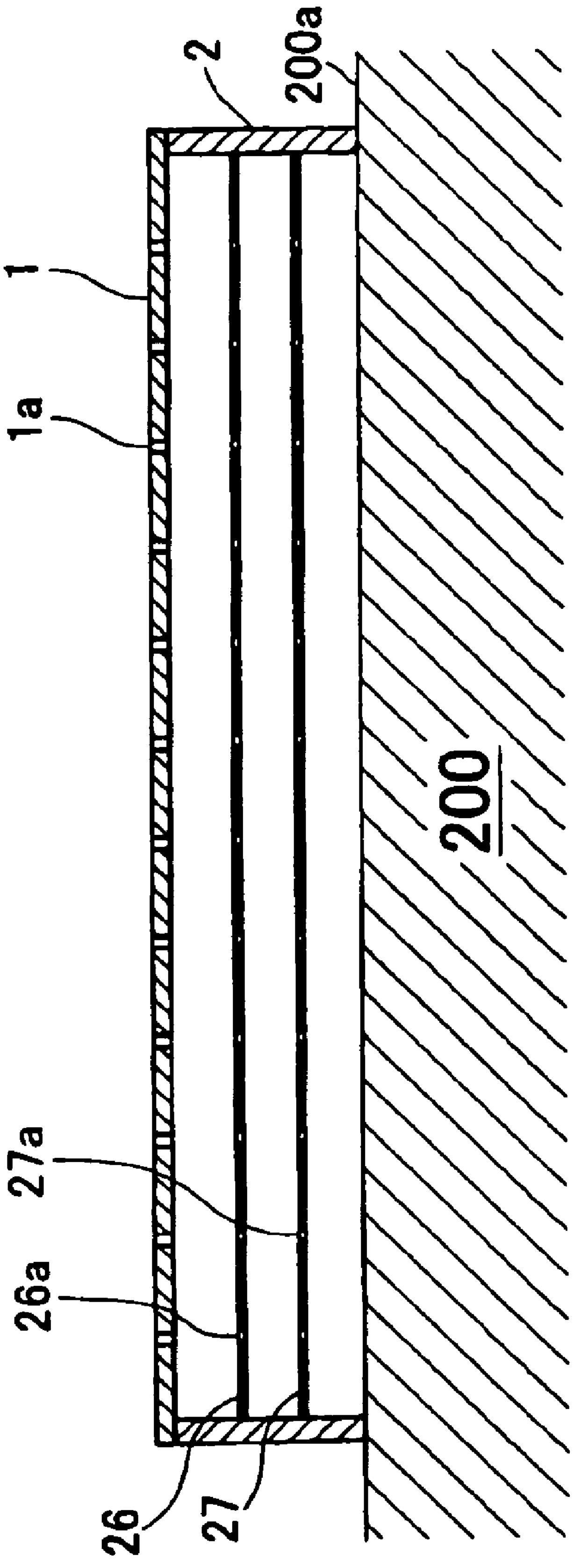
FIG. 11 is a schematic cross-sectional view showing a modification example of the solid-borne sound reducing structure depicted in FIG. 1.
Figure 12:
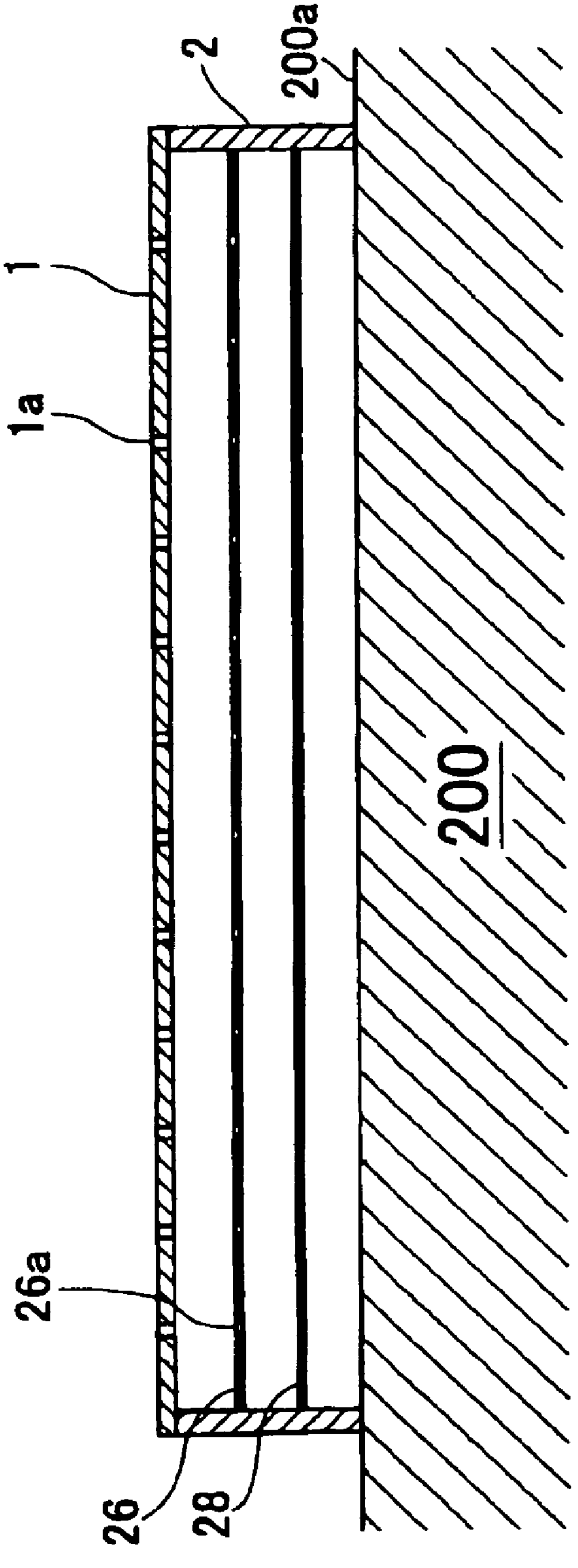
FIG. 12 is a schematic cross-sectional view showing a modification example of the solid-borne sound reducing structure depicted in FIG. 1.

Note that the structure is not limited to the instance in which one sheet of the partition plate 23 is inserted between the surface plate part 21 and the vibration plane 202*a* as analysis model shown in FIG. 9, and a plurality of partition plates 26, 27 having the penetration holes 26*a*, 27*a* may be inserted as shown in FIG. 11. In this case, the amount of reduction in radiation power can be further increased. Further, the partition plate is not necessarily formed as the perforated plate, and a flat plate 28 having no hole may be used as shown in FIG. 12. In this case, because it is unnecessary to form the perforation holes, manufacturing can be readily performed. Further, a partition plate in the form of a thin film such as foil or a sheet may be used. It should be noted that, in FIGS. 11 and 12, components identical to those of the solid-borne sound reducing structure 100 depicted in FIG. 1 are identified by the same reference symbols as those of the solid-borne sound reducing structure 100.

Figure 13:
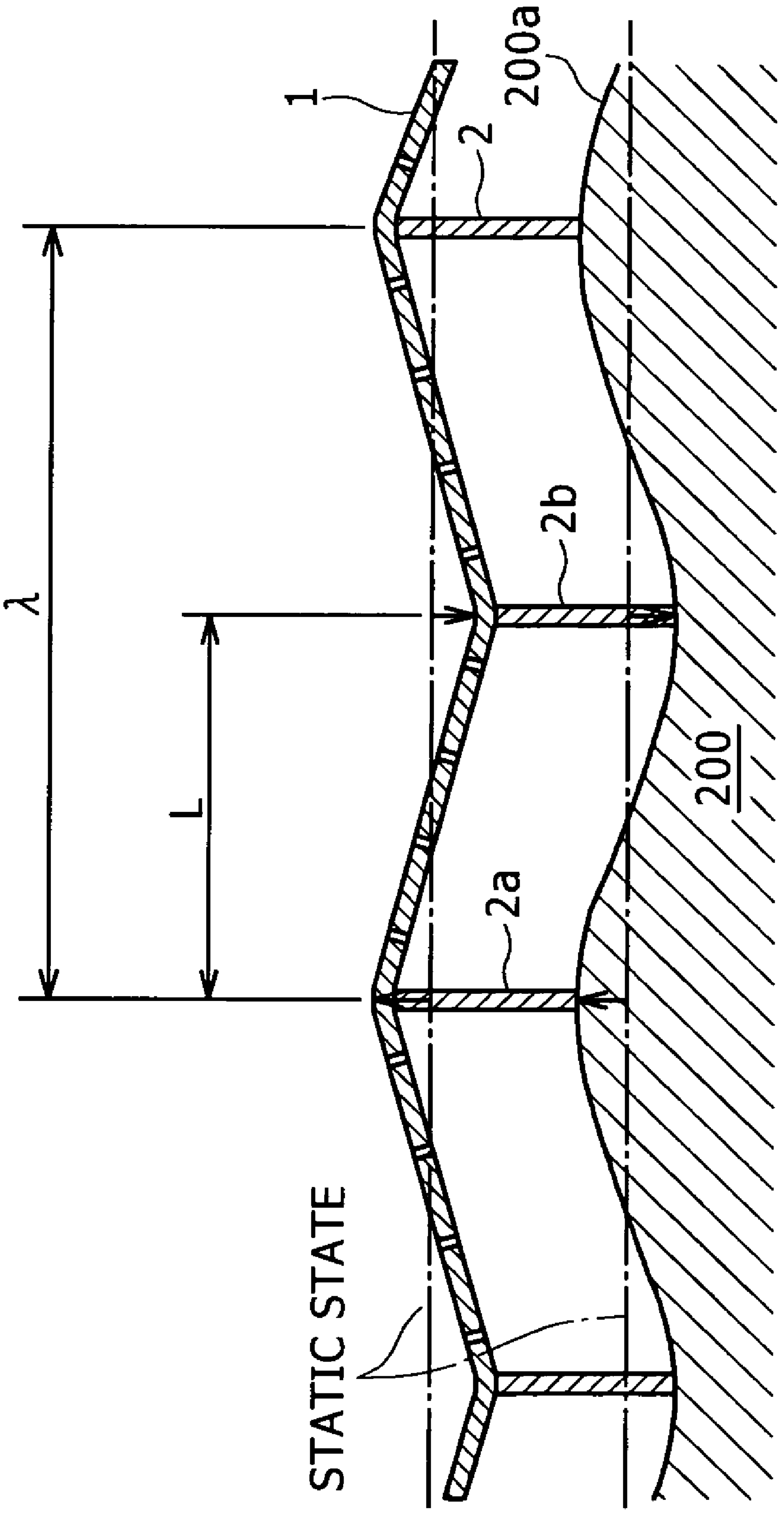
FIG. 13 is a schematic cross-sectional view showing the solid-borne sound reducing structure which is vibrating.

Meanwhile, as shown in FIG. 13, in an instance where the structure 200 which radiates noise while vibrating undergoes a vibration having non-uniform amplitude/phase during the noise radiation, vibration amplitudes of adjacent two frame member, for example, the frame member 2*a* and the frame member 2*b* vary at times (differ in displacement direction and displacement amount). In FIG. 13, the frame member 2*a* is displaced upward from a static position, whereas the frame member 2*b* is, contrary to the frame member 2*a*, in a state displaced downward from the static position. When the frame members are displace as described above, the perforated plate 1 situated between the frame member 2*a* and the frame member 2*b* moves upward from the static position in close proximity of the frame member 2*a* and moves downward from the static position in close proximity of the frame member 2*b*, resulting in a non-uniform vibration. Such a non-uniform vibration of the perforated plate 1 is problematic because the effect of solid-borne sound reduction is degraded by the non-uniform vibration. In particular, when an interval "L" at which the perforated plate 1 is supported by the frame member 2 coincides with ½ of a wavelength "λ" of either a bending wave propagating in the in-plane direction on the surface of the structure 200 or a standing wave resulting from the bending wave, the frame member 2*a* and the frame member 2*b* will be respectively vibrated in opposite phase, resulting in a greater vibration distribution.

Figure 14:
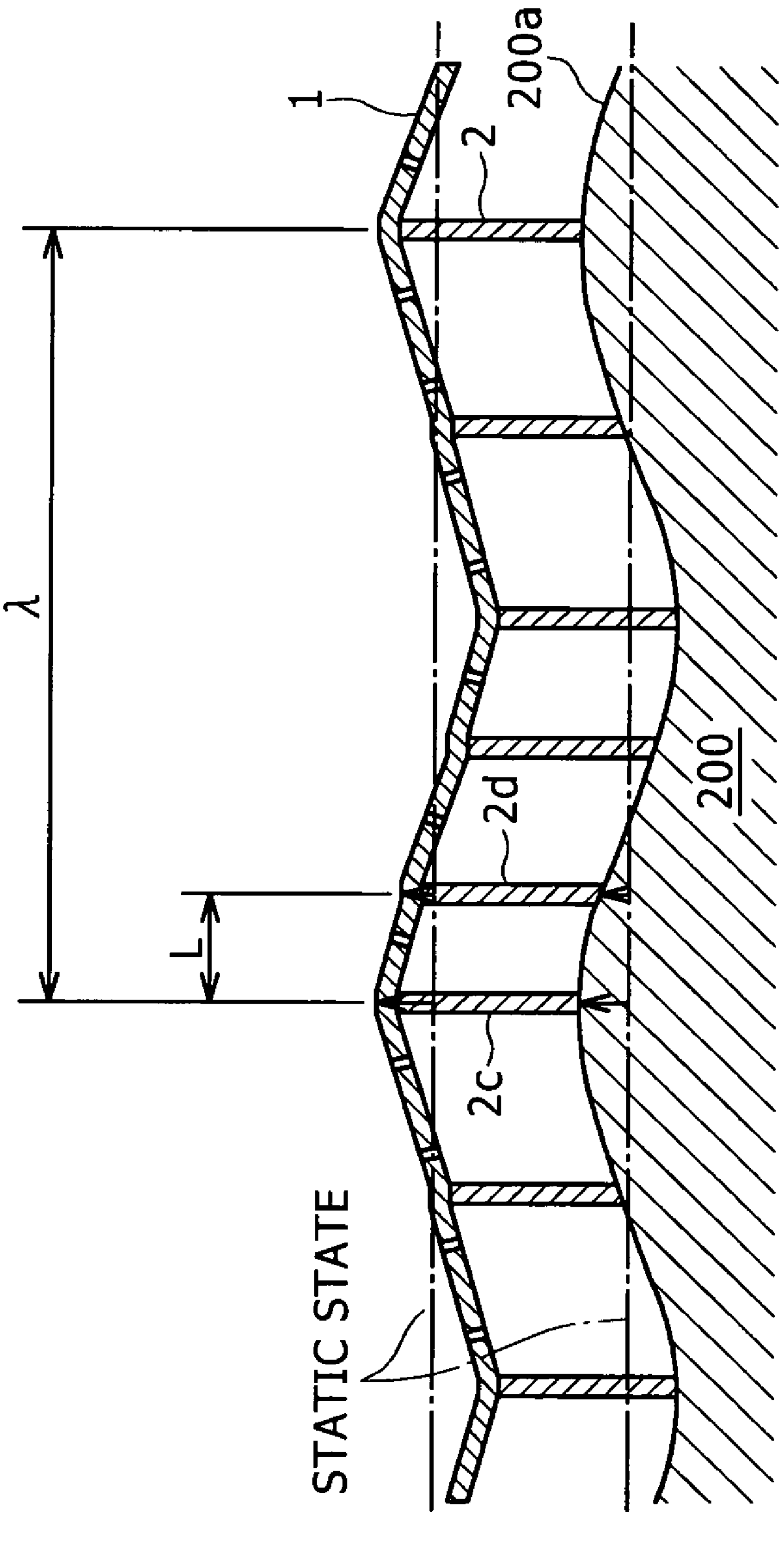
FIG. 14 is a schematic cross-sectional view showing a modification example of the solid-borne sound reducing structure depicted in FIG. 1.

For that reason, the interval "L" at which the perforated plate 1 is supported by the frame member 2 is set, as shown in FIG. 14, to an interval shorter than the half wavelength of the bending wave propagating in the in-plane direction on the surface of the structure 200 in the frequency band of the noise to be reduced, or than the half wavelength of the standing resulting from the bending wave, occasional difference of vibration amplitude between the adjacent frame members (for example, between the frame member 2*c* and the frame member 2*d*) can be decreased. Here, in FIG. 14, both the frame member 2*c* and the frame member 2*d* are displaced upward from the static position, and the difference between the displacement amounts becomes smaller. In this way, the perforated plate 1 is vibrated more uniformly between the frame members, thereby allowing more stable reduction of solid-borne sound. Note that it is desirable to define the interval between the frame members as being greater than or equal to 1/32 of the wavelength of either the bending wave or the standing wave resulting from the bending wave. When the interval between the frame members is defined to be greater than or equal to 1/32 of the wavelength of the sound wave, an excessive increase of the number of the frame members can be suppressed, to thereby suppress the possibility that the capacity of the internal gas chamber necessary for exerting the effect of solid-borne sound reduction is downsized by the volume of the frame members themselves.

Next, with reference to experimental data, the effect of the present invention in a case where there is a vibration distribution on the surface of the structure will be described. As a test specimen, the structure is simulated using a steel sheet (300 mm×150 mm×4.5 mm thickness). The four corners of the steel sheet are simply supported, and, in this state, the center of the steel plate is caused to vibrate by a vibration machine.

It was confirmed that the vibration distribution on the bare steel sheet before taking measures is of a third flexural mode in the longitudinal direction.

As the perforated plate 1 to be installed on the steel plate (the simulated structure), an aluminum plate which has a thickness of 0.3 mm, a hole diameter of 0.3 mm, and porosity of 0.3% was used. In order to form an air layer (the internal gas chamber 3) of 20 mm in thickness, the perforated plate 1 was supported against the steel plate at the outer peripheral edges (4 sides) of the perforated plate 1 by frame members, and an internal region surrounded by the frame members was also supported by support walls.

The above-described specifications are designed to obtain the effect at 1050 Hz or higher.

The support walls for supporting the perforated plate 1 were, in addition to being disposed with a 10-mm pitch in a longitudinal direction of the steel plate, provided along the entire length in a narrow side direction of the steel plate, and the perforated plate 1 was bonded to vertex parts of the support walls.

In the configuration after taking measures where the perforated plate 1 is supported by the support walls placed on the steel sheet, the vibration distribution of the perforated plate 1 was found to be of the third flexural mode in the longitudinal direction as in the case of the vibration distribution before taking measures. In addition, it was also recognized in the configuration after taking measures that the perforated plate 1 was vibrated integrally with the steel plate due to the bonding by means of the support walls.

In the experiment, a sound pressure level was measured in a location at a distance of 50 mm from the center of the steel plate in the configuration before taking measures in which the perforated plate 1 is not provided. On the other hand, the sound pressure level was measured in a location at a distance of 50 mm from the center of the perforated plate in the configuration after taking measures provided with the perforated plate 1.

Then, a difference between the sound pressure level before taking measures and that after taking measures was calculated to determine an amount of reduction in sound pressure level.

Figure 15:
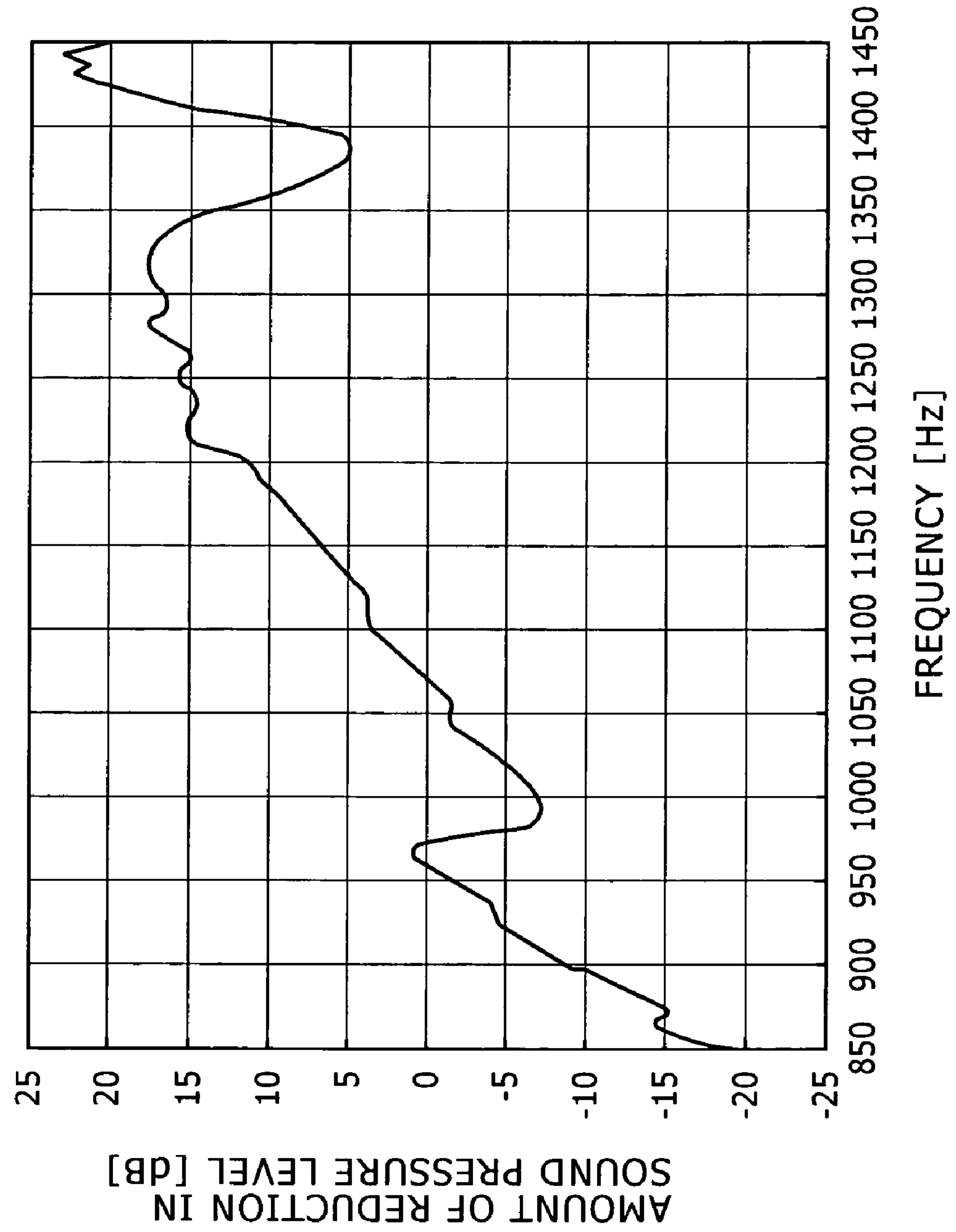
FIG. 15 is a graph showing a relationship between the vibration frequencies and amounts of reduction in radiation sound according to the present invention obtained by experiment.

Experimental results are shown in FIG. 15. As indicated in the experimental results, the structure after taking measures proved capable of having an effect of reducing radiation sound of up to 22 dB in a frequency band from approximately 1050 Hz or higher.

As a comparison example, a specimen in which the perforated plate 1 was bonded to the steel plate by means of the frame members and support braces having a greater support pitch in such a manner that the thickness of the air layer (the internal gas chamber 3) was defined to 20 mm.

More specifically, the outer peripheral edges (4 sides) of the perforated plate 1 were supported by the frame members, while the support braces were disposed with a 20-mm pitch in the longitudinal direction and a 35-mm pitch in the narrow side direction, to bond the perforated plate 1 to the steel plate. In this comparison example, the four corners of the steel plate were simply supported, and the center of the steel plate was vibrated by the vibration machine.

A vibration distribution which has no correlation to the vibration of the steel plate was generated on the perforated plate of the above-described specimen.

Also in the experiment of the comparison example, in the configuration before taking measures, the sound pressure level was measured in the location at the distance of 50 mm from the center of the steel plate (before taking measures), while, in the configuration after taking the measures, the sound pressure level was measured in the location at the distance of 50 mm from the center of the perforated plate, as in the case of the experiments for the present invention.

Then, the difference between the sound pressure level before taking measures and that after taking measures was calculated to determine the amount of reduction in sound pressure level.

Figure 16:
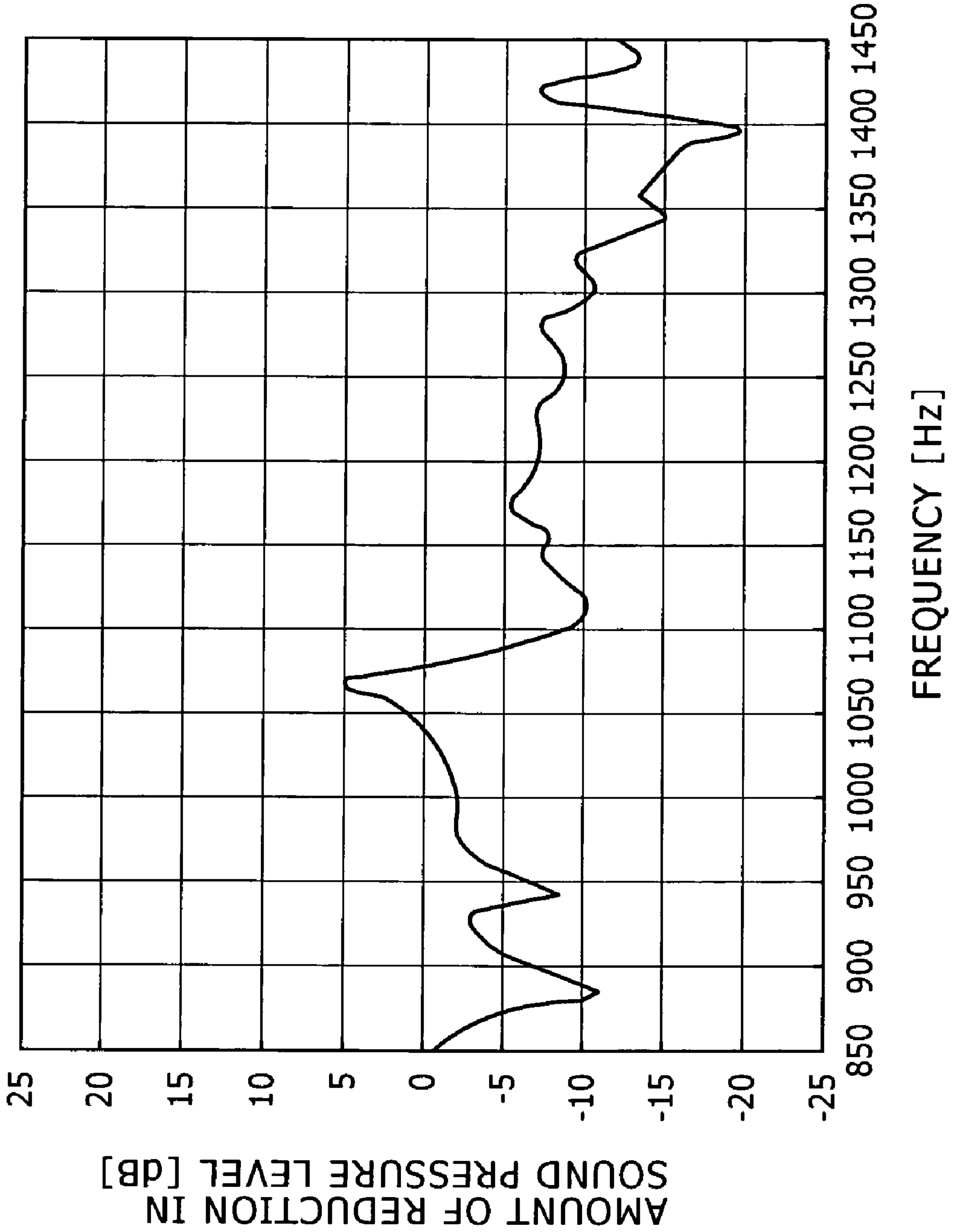
FIG. 16 is a graph showing a relationship between the vibration frequencies and amounts of reduction in radiation sound according to a comparison example obtained by experiment.

FIG. 16 shows experimental results for the comparison example. As shown in the experimental results, the comparison example presented, in almost all bands, negative values for the amount of reduction in sound pressure level, and radiation sound was increased. As a reason for the increase of the radiation sound in the comparison example, it can be considered that the vibration of the perforated plate was not integral with that of the steel plate.

Second Embodiment

Figure 17:
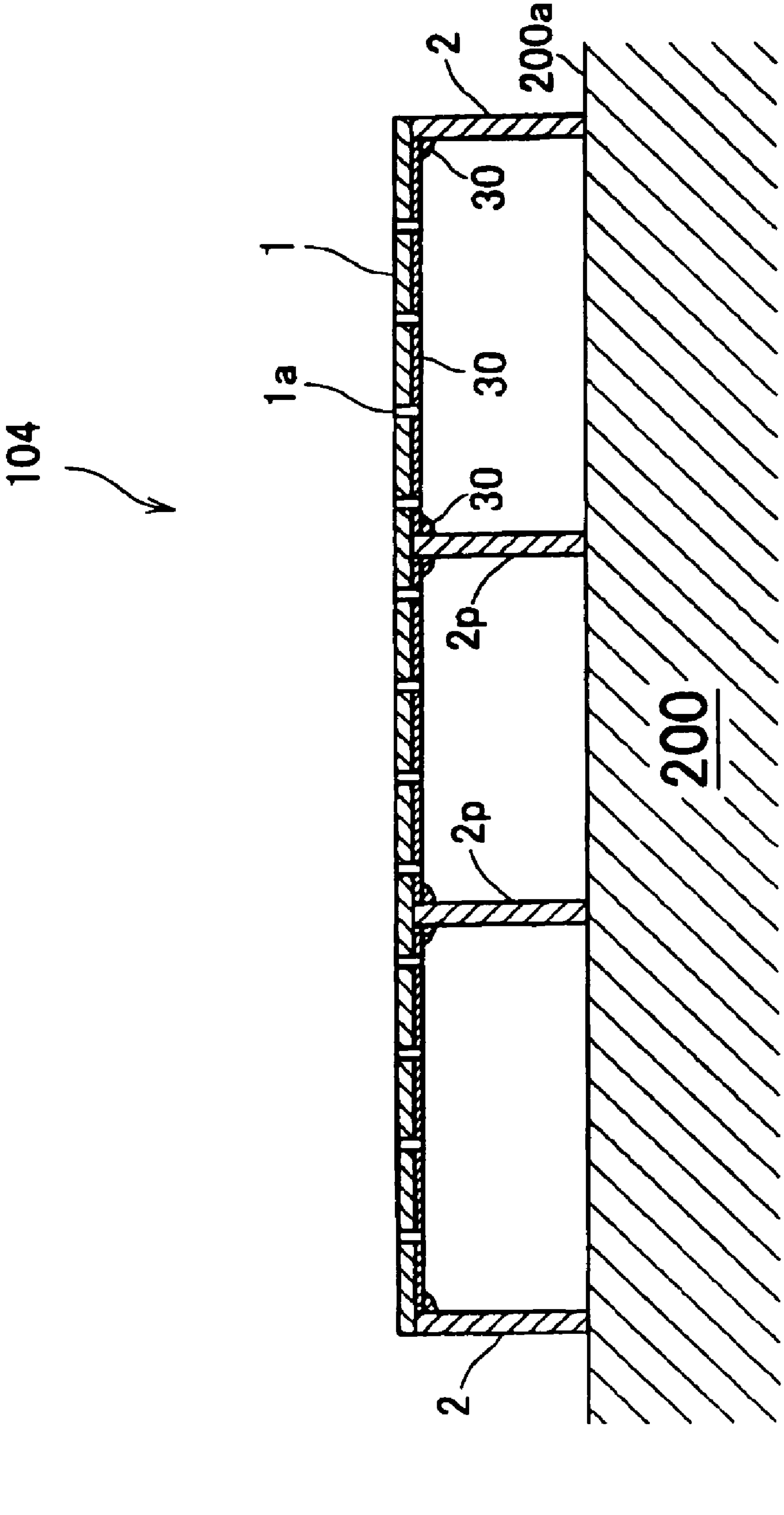
FIG. 17 is a schematic cross-sectional view showing a solid-borne sound reducing structure according to a second embodiment.

In FIG. 17, a solid-borne sound reducing structure 104 according to a second embodiment is shown. The solid-borne sound reducing structure 104 according to the second embodiment is constructed by mounting vibration damping materials 30 on the perforated plate 1 in the solid-borne sound reducing structure 101 according to the modification example of the first embodiment illustrated in FIG. 2. It is to be noted that components the same as those in FIG. 2 are identified by the same reference symbols as those of FIG. 2, and descriptions related to the components are not repeated.

The vibration damping materials 30, which may be configured using, for example, a sheet like member having viscoelasticity, an adhesive, or the like, are bonded to a surface (back side) of the perforated plate 1 opposed to a structure 200 side so as to be deformed as the perforated plate 1 become deformed. Although the vibration damping materials 30 may be bonded to a surface (front side) of the perforated plate 1 opposed to the outside, bonding the vibration damping materials 30 to the back side is efficient because an outward appearance of the structure 200 to which the solid-borne sound reducing structure 104 is attached is not disturbed by the bonding. Further, because the bonding is performed without blockage of the perforation holes 1*a*, any increase in the acoustic radiation efficiency is not caused. In this configuration, when the perforated plate 1 is vibrated and deformed due to the vibrations of the structure 200, the vibration damping materials 30 will be accordingly deformed. Then, because vibration energy is consumed through the deformation of the vibration damping materials 30, the vibration can be damped. As a result, resonance of the perforated plate 1 can be suppressed, thereby allowing reduction of the solid-borne sound in a broader frequency range. It should be noted that the configuration is not limited to the example in which the vibration damping materials 30 are bonded onto the entire area of the perforated plate 1, and the vibration damping materials 30 may be bonded in part. In this case, usage of the vibration damping materials 30 can be reduced, which can bring about reduction in cost.

Figure 18:
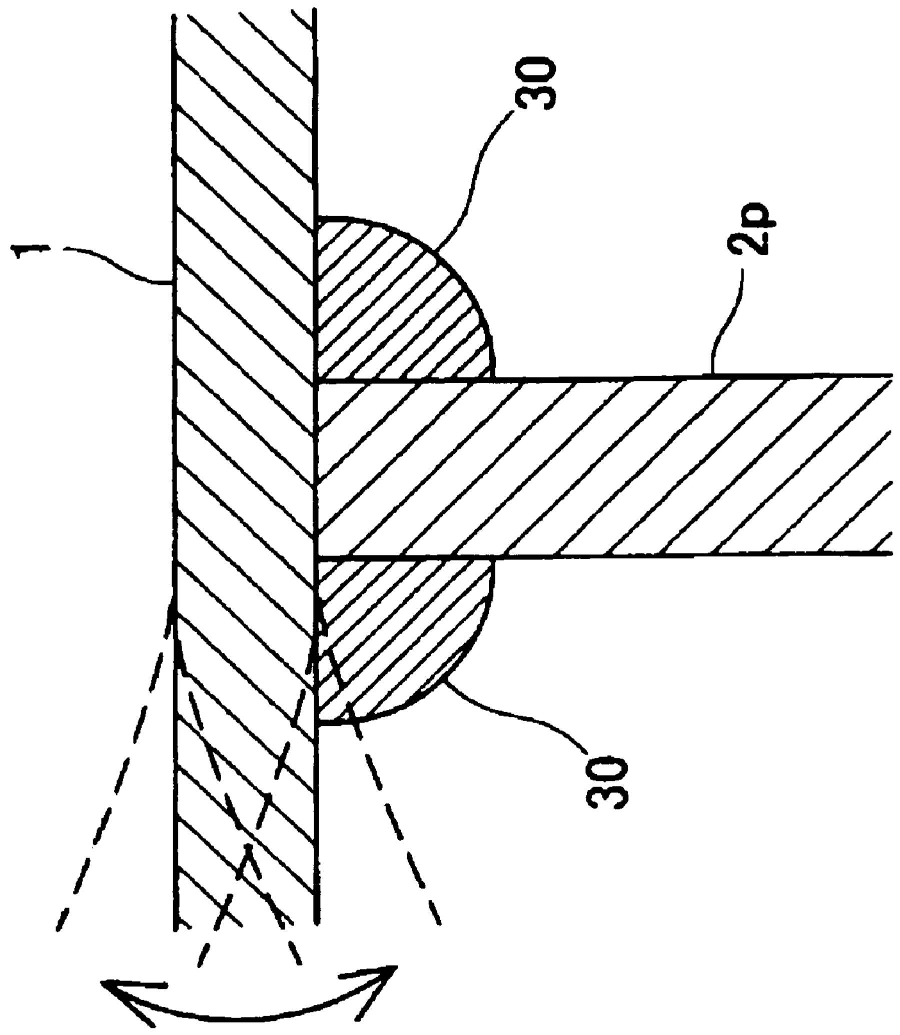
FIG. 18 is a partial enlarged view of the solid-borne sound reducing structure depicted in FIG. 17.

Moreover, as shown in an enlarged view of a joint part between the perforated plate 1 and the frame member 2*p* in FIG. 18, the vibration damping materials 30 are disposed in the vicinity of the joint part between the perforated plate 1 and the frame member 2*p*. When the vibration damping materials 30 are placed on such corners, deformation of the perforated plate 1 due to the vibrations of the structure 200 causes the vibration damping materials 30 to be compressed, stretched, or subjected to a shearing force between the perforated plate 1 and the frame member 2, resulting in deformation of the vibration damping materials 30. At this time, as compared with a case where the vibration damping materials 30 are disposed on locations joined to only the perforated plate 1, a higher proportion of deformation volume of the vibration damping materials 30 relative to the deformation volume of the perforated plate 1 can be realized, which can bring about a greater damping of the vibration of the perforated plate 1.

Third Embodiment

Figure 19:
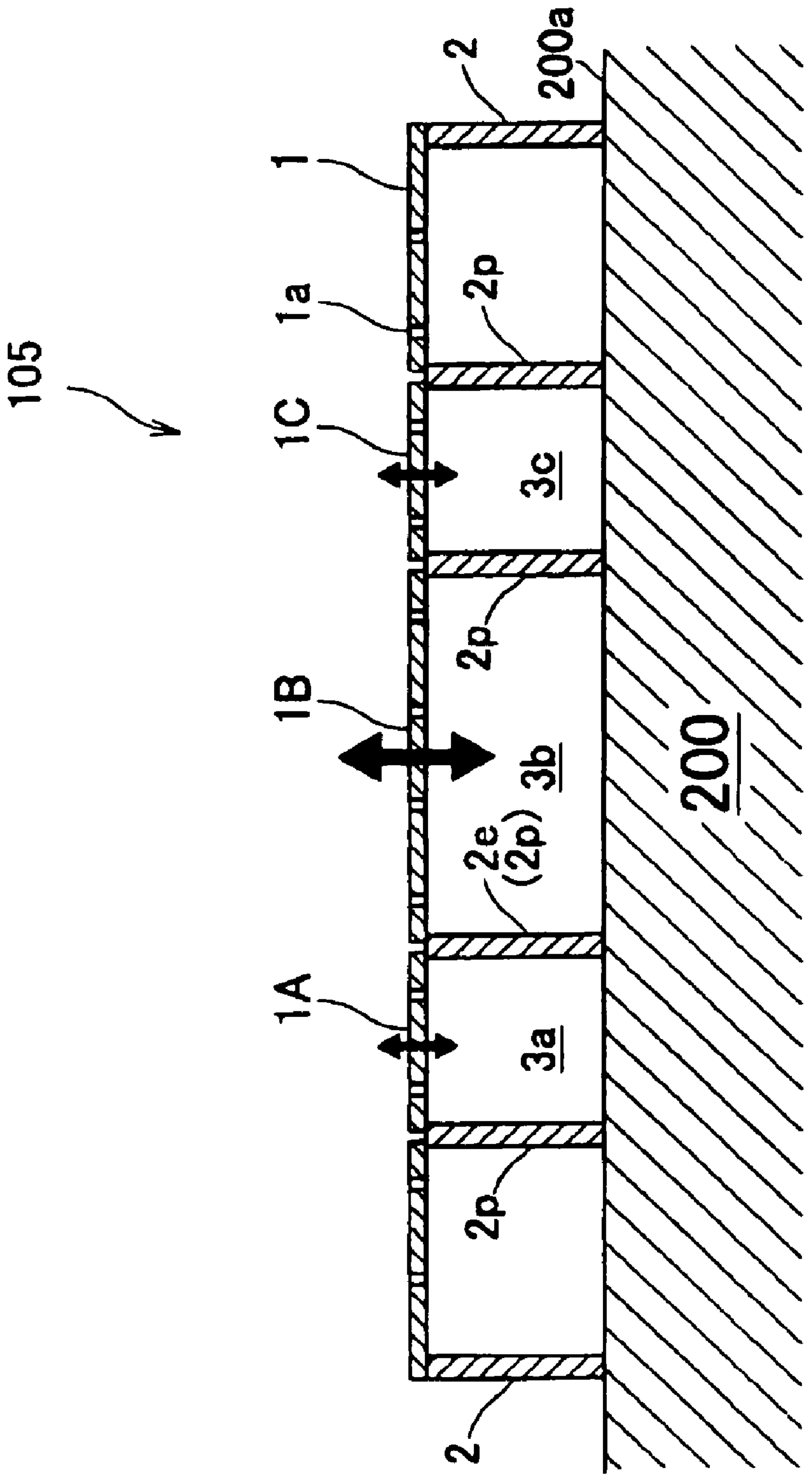
FIG. 19 is a schematic cross-sectional view showing a solid-borne sound reducing structure according to a third embodiment.
Figure 20:
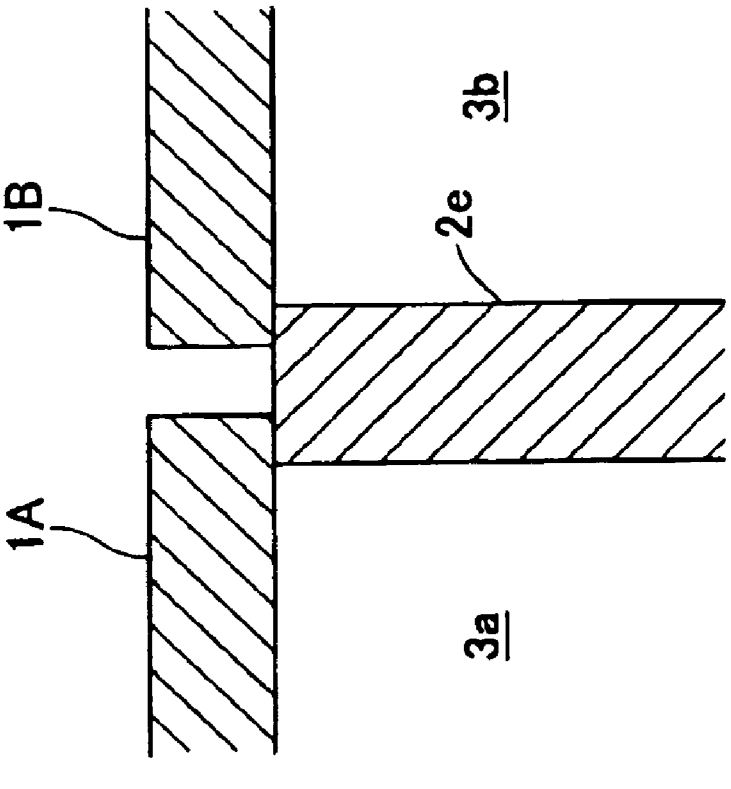
FIG. 20 is a partial enlarged view of the solid-borne sound reducing structure depicted in FIG. 19.

FIG. 19 shows a solid-borne sound reducing structure 105 according to a third embodiment, and FIG. 20 shows an enlarged view of a joint area between the perforated plate 1 and the frame member 2*e* in the solid-borne sound reducing structure 105 illustrated in FIG. 19. The solid-borne sound reducing structure 105 according to the third embodiment has a configuration in which the space between the perforated plate 1 and the structure 200 is partitioned by the frame members 2 and the frame members 2*p* into a plurality of sections, so that the different sized divided internal gas chambers 3*a*, 3*b*, 3*c*, and so on are formed. In addition, the perforated plate 1 is separately joined at an end part of the frame member 2*p*. For example, the perforated plate 1 arranged to cover the two divided internal gas chambers 3*a* and 3*b* adjoining over the frame member 2*e* to each other is formed so as to be separated into a perforated plate 1A and a perforated plate 1B at a location supported by the frame member 2*e* (refer to FIG. 20).

When each section (the divided internal gas chamber) has a different size as shown in FIG. 19, or in other situations, only a portion of the perforated plate 1 (for example, a portion of the perforated plate 1B) can be significantly vibrated (vibrations are shown by arrows in the drawing). Even in such situations, because the perforated plate 1 is separated at the end part of the frame member 2*p*, the vibration of the perforated plate 1B constituting one part of the perforated plate 1 divided into multiple sections is prevented from propagating to the adjoining perforated plates 1A, 1C, etc. Therefore, more stable reduction of the solid-borne sound can be realized in a further broader frequency range.

Figure 21:
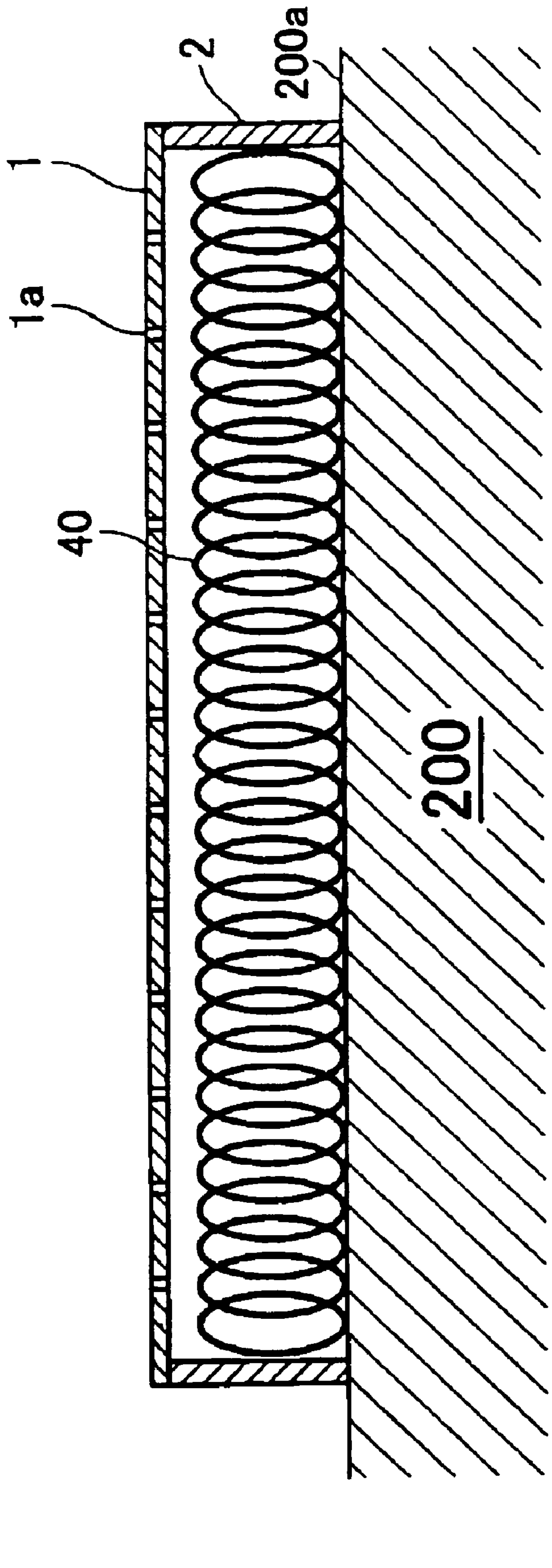
FIG. 21 is a schematic cross-sectional view showing a modification example of the solid-borne sound reducing structure depicted in FIG. 1.

Note that although the internal gas chamber which is the space between the perforated plate and the noise radiating structure are formed as the air layer in the above-described embodiments, a sound absorbing material 40 may be installed in the internal gas chamber 3 as shown in FIG. 21. As the sound absorbing material 40, fibrous material such as glass wool, a porous substance such as resin foam, and the like may be used. When the sound absorbing material 40 is installed, the vibration energy of atmosphere in the internal gas chamber 3 can be consumed as friction energy between the atmosphere and the sound absorbing material 40. In this manner, it can be suppressed that the sound pressure amplified by resonance of the sound wave in the inner gas chamber 3 increases the vibration of the perforated plate 1.

Figure 22:
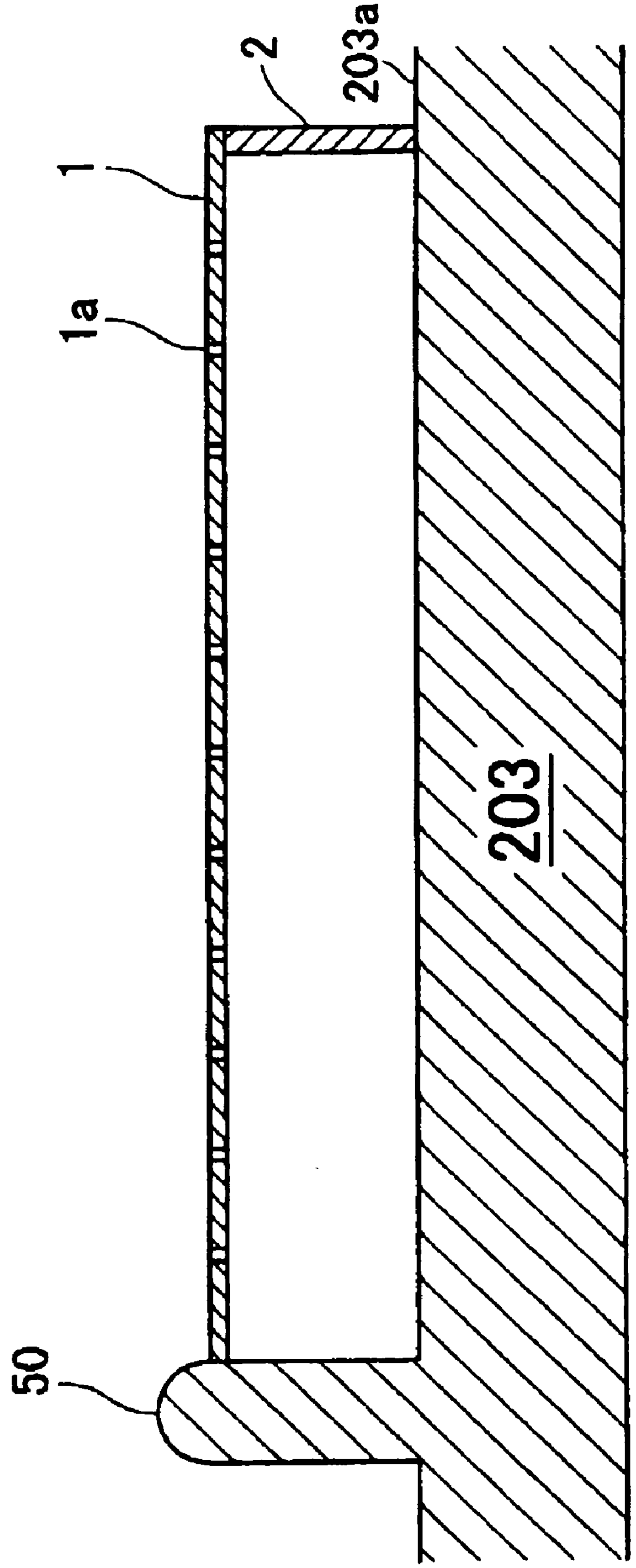
FIG. 22 is a schematic cross-sectional view showing a modification example of the solid-borne sound reducing structure according to the present invention.

Further, the surface plate part and the wall parts are not limited to be formed as members independent of the noise radiating structure, but as shown in FIG. 22, using a rib 50 or the like previously formed on a surface of a device 203 that radiates noise while vibrating as the wall part, the surface plate part 1 may be installed on the surface of the device 203 through the partially-attached frame member 2.

Figure 23:
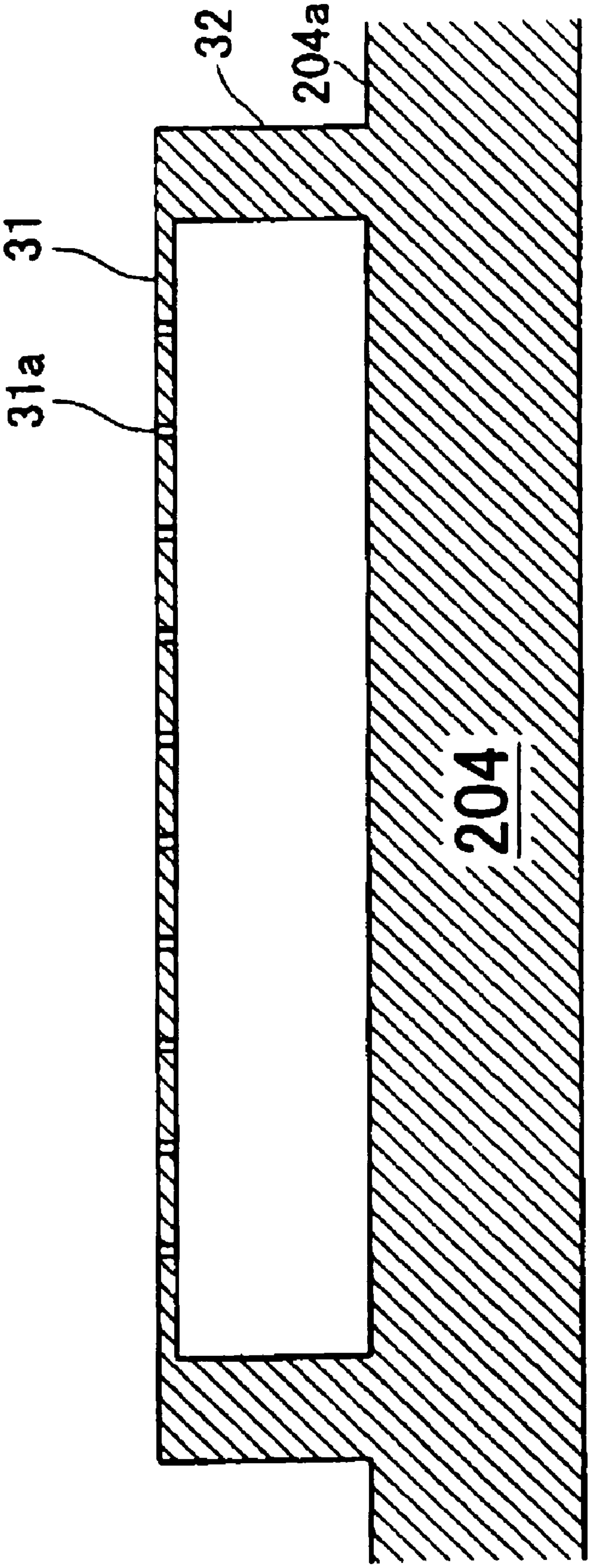
FIG. 23 is a schematic cross-sectional view showing a modification example of the solid-borne sound reducing structure according to the present invention.

Still further, as shown in FIG. 23, a noise radiating structure 204, a surface plate part 31 having perforation holes 31*a*, and a wall part 32 for supporting the surface plate part 31 may be integrally formed. In this case, backlash or the like does not occur in junctions between the surface plate part 31 and the wall part 32 and between the wall part 32 and the structure 204, which can facilitate suppression of a noise generated in the junctions. Moreover, because the same material is used for forming the parts, it is easier to recycle.

Fourth Embodiment

Figure 24A:
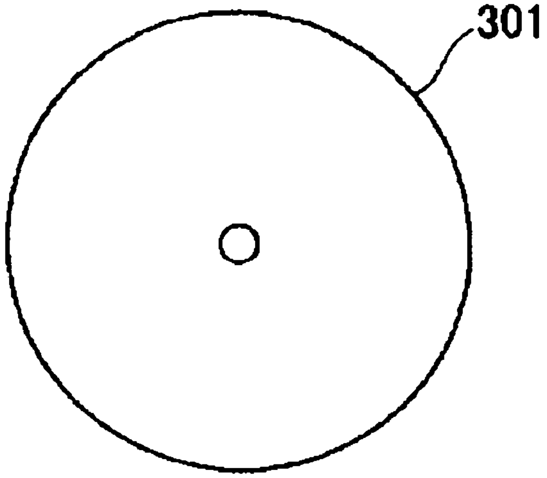
FIGS. 24A-24B illustrate a compressor as a noise radiating structure.
Figure 24B:
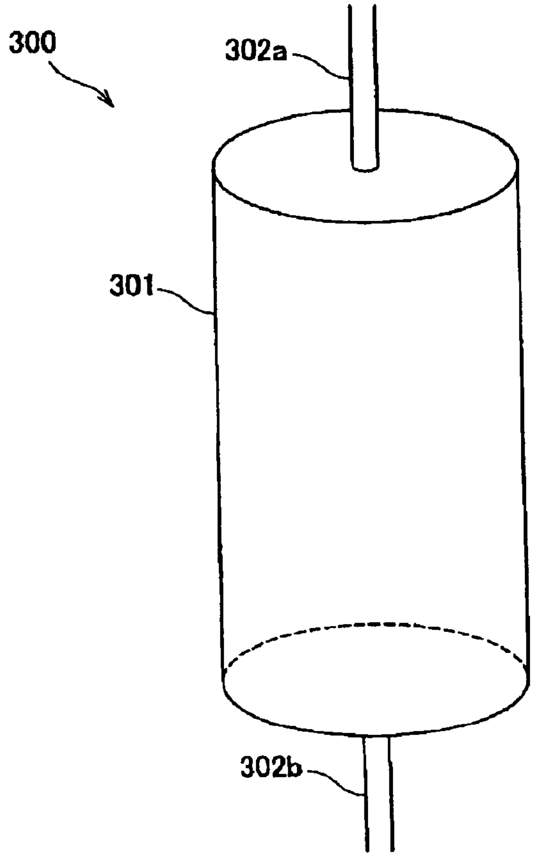

FIG. 24A shows a schematic plan view of a compressor body 300 as a noise radiating structure, and FIG. 24B shows a schematic perspective view thereof. On the other hand, FIG. 25A shows a schematic plan view of a state where a solid-borne sound reducing structure 400 is installed on an outer surface of the compressor body shown in FIG. 24, and FIG. 25B shows a schematic perspective view thereof.

As shown in FIG. 24, a casing 301 of the compressor is formed in a cylindrical shape, and while the compressor is being driven, a pressure transmission medium flows through a medium influent duct 302*a* into the body and flows out through a medium discharge duct 302*b* to the outside. As shown in FIG. 25, a perforated plate 401 in which a plurality of perforation holes 401*a* are formed is supported so as to entirely cover an outer peripheral surface of the casing 301 at a predetermined distance from the outer peripheral surface of the casing 301 by partition plates 402. The partition plates 402, composed of partition plates 402*a* extending in parallel to a direction of a cylinder axis of the casing 301 and partition plates 402*b* orthogonal to the partition plates 402*a*, support the perforated plate 401, and partition a space between the perforated plate 401 and the outer peripheral surface of the casing 301 to form a plurality of divided internal gas chambers.

Figure 25A:
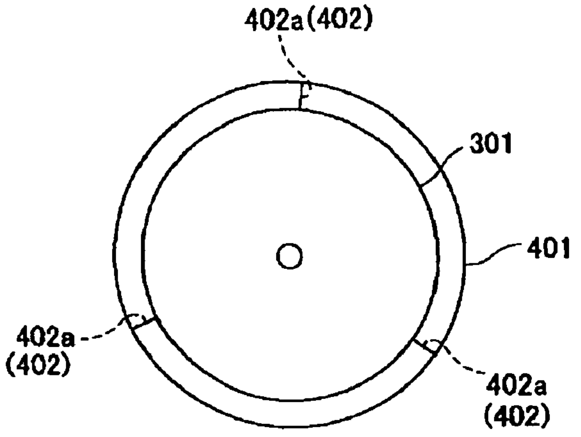
FIGS. 25A-25B illustrate the compressor depicted in FIG. 24 in which the solid-borne sound reducing structure is installed.
Figure 25B:
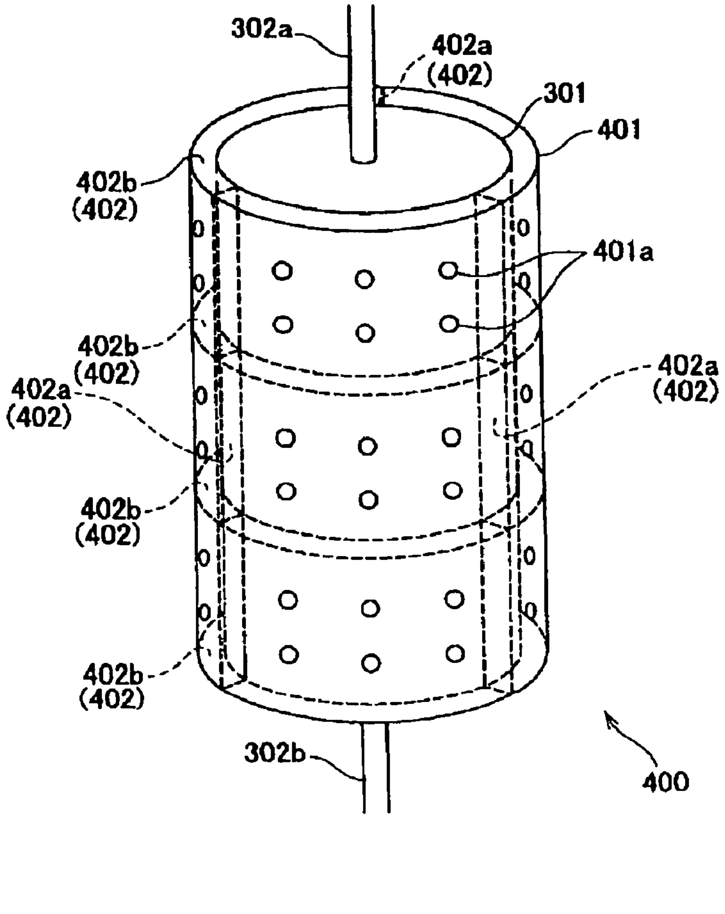

It is to be noted that although, in this embodiment, the space between the perforated plate 401 and the outer peripheral surface of the casing 301 is divided into 3 sections in a circumferential direction of the casing 301 by the partition plates 402*a* as shown in FIG. 25A and also divided into 3 sections in the direction of the cylinder axis by the partition plates 402*b* as shown in FIG. 25B, intervals between the sections or the number of the sections formed by the partition plates may be appropriately adjusted depending on a vibration frequency band (the target frequency band) of the casing 301.

When the solid-borne sound reducing structure is installed on the surface of the casing 301 of the compressor as described above, because the perforated plate 401 is integrally vibrated with the casing 301, the noise to be radiated to surroundings due to the vibration of the casing 301 during the driving of the compressor can be reduced.

Figure 26A:
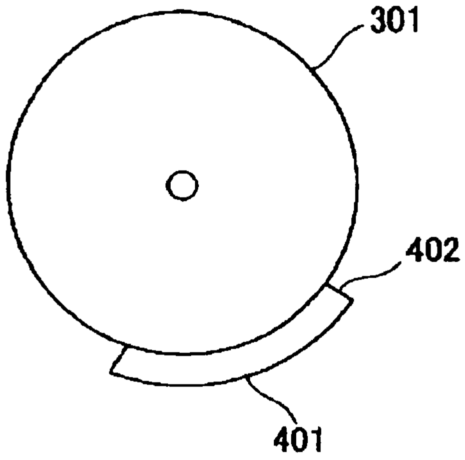
FIGS. 26A-26B illustrate the compressor depicted in FIG. 24 in which the solid-borne sound reducing structure is installed.
Figure 26B:
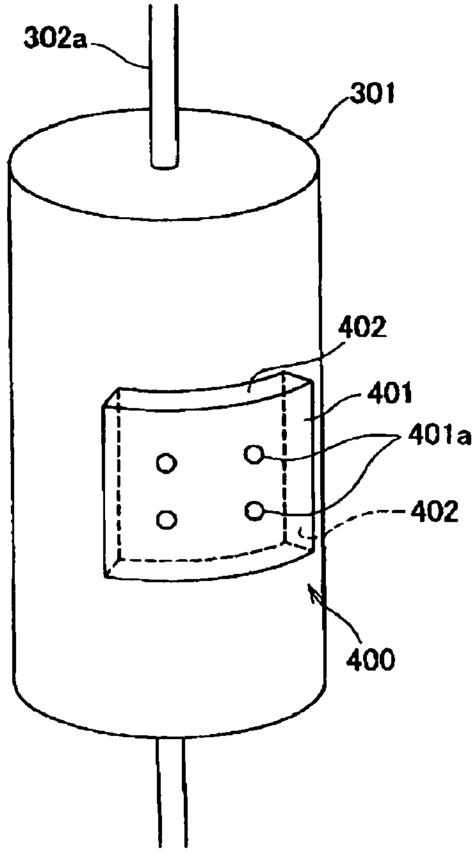

In addition, the perforated plate 401 is not limited to be installed on the whole surface area of the casing 301. For example, as shown in FIGS. 26A and 26B, one section of the perforated plate 401 and the partition plates 402 may be partially attached to the surface, to form the solid-borne sound reducing structure 400.

Fifth Embodiment

Figure 29:
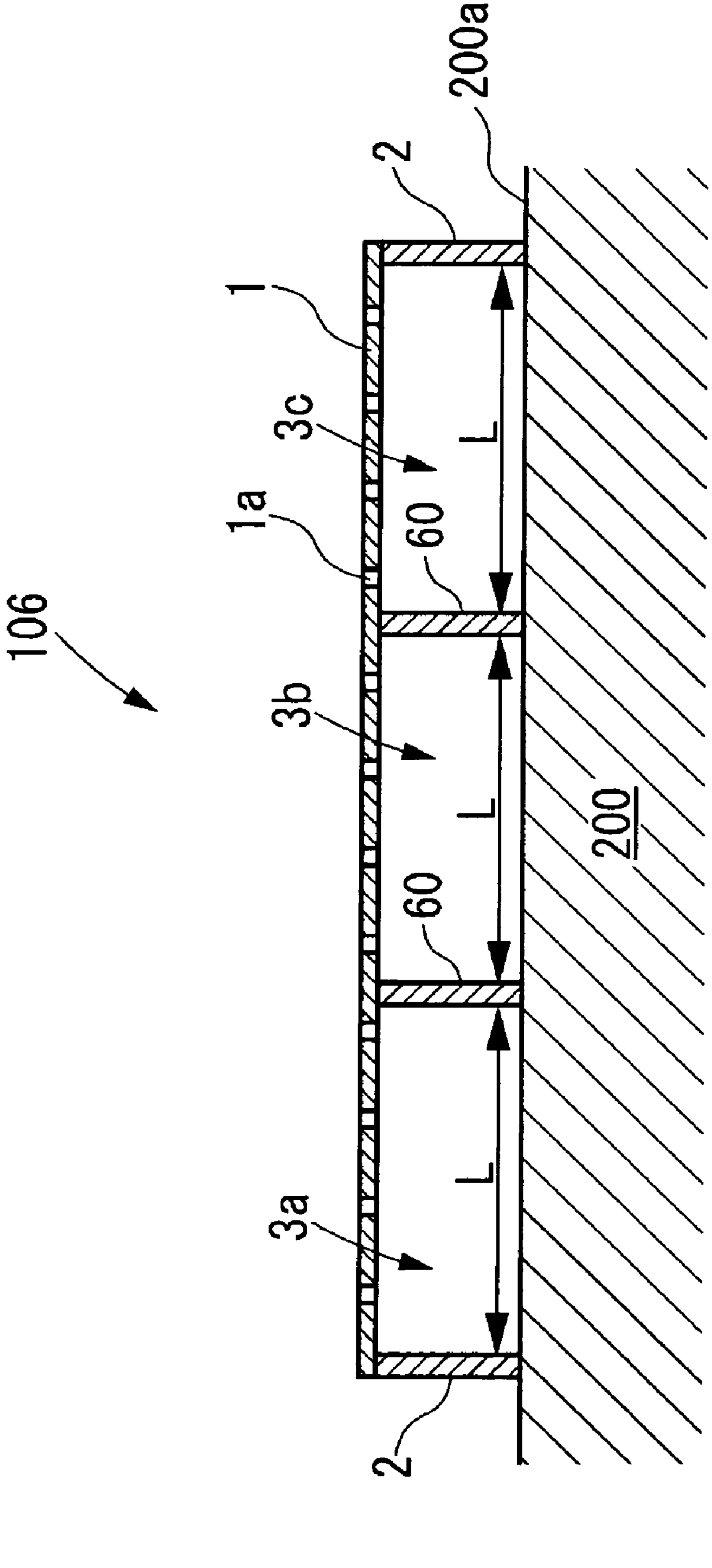
FIG. 29 is a schematic cross-sectional view showing a solid-borne sound reducing structure according to a fifth embodiment.

FIG. 29 shows a solid-borne sound reducing structure 106 according to a fifth embodiment. The solid-borne sound reducing structure 106 according to the fifth embodiment has a configuration further comprising column parts 60 for supporting the perforated plate 1 in the solid-borne sound reducing structure 100 according to the first embodiment shown in FIG. 1. Note that components the same as those of FIG. 1 are identified by the same reference symbols as those of FIG. 1, and descriptions related to the components will not be repeated.

The column parts 60 are simply constructed members such as rectangular columns or circular columns vertically disposed on the surface of the structure 200. The column parts 60 can be more compactly configured as compared to the frame members 2*p* of the first embodiment shown in FIG. 2. Further, when the column parts 60 are installed in place of the frame members 2*p* of the first embodiment, the perforated plate 1 can be efficiently supported without dividing the internal gas chamber 3 into multiple chambers.

Here, specifications and placement of the column parts 60 may be determined in a manner similar to those of the first embodiment.

According to the configuration of the fifth embodiment, as compared to the example where the perforated plate 1 is supported by the frame members 2*p* (refer to FIG. 2), a vibration distribution that could be generated on the perforated plate 1 can be suppressed in the simpler configuration at a lower cost, and a further significant effect of reducing the solid-borne sound can be realized. Further, the perforated plate 1 can be prevented from resonating, thereby allowing the reduction of the solid-borne sound in a further broader frequency range. Furthermore, when the frame members 2*p* are used in combination, further optimum design of the solid-borne reducing structure can be realized.

Sixth Embodiment

Figure 30:
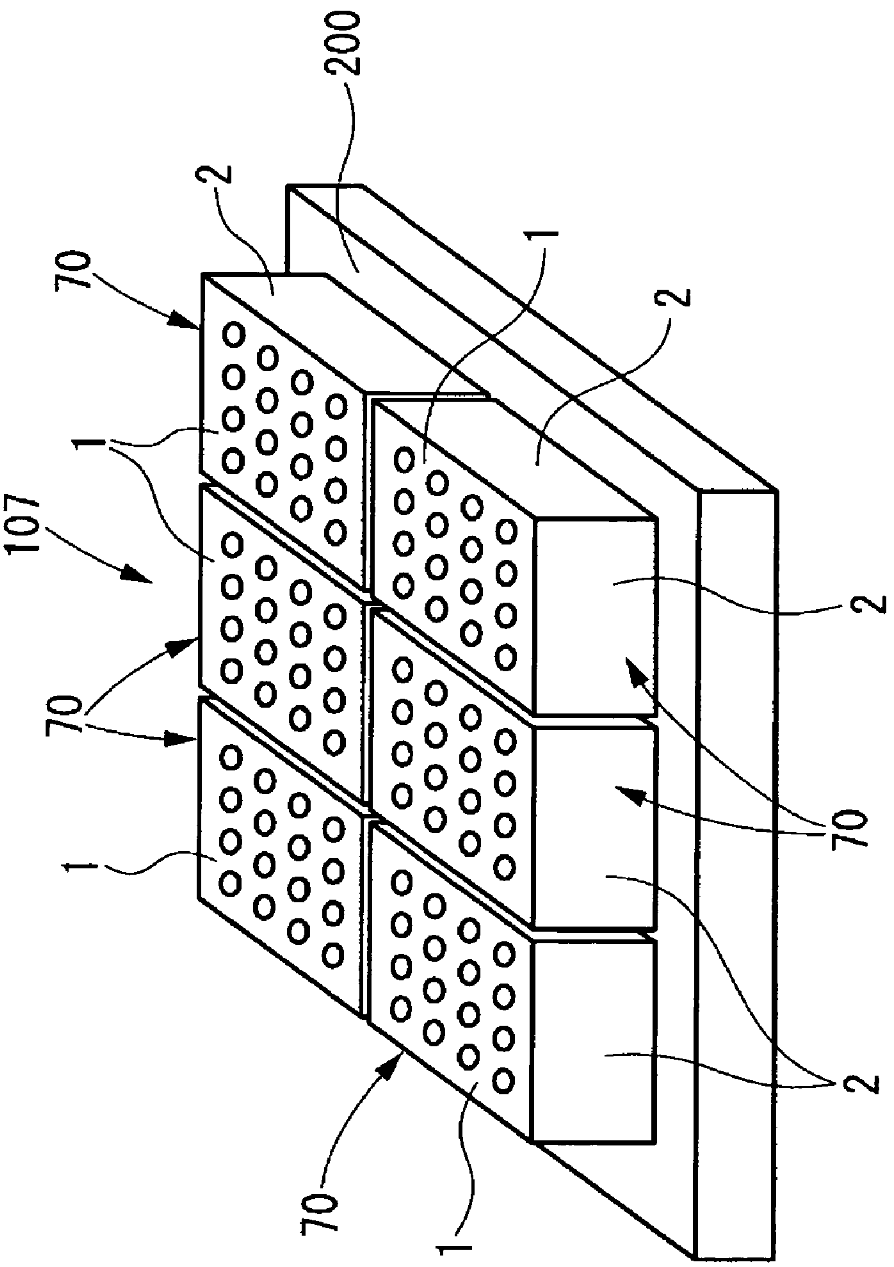
FIG. 30 is a schematic diagram showing a solid-borne sound reducing structure according to a sixth embodiment.

FIG. 30 shows a solid-borne sound reducing structure 107 according to a six embodiment. The solid-borne sound reducing structure 107 according to the sixth embodiment has a configuration such that a box-shaped body 70 formed by the perforated plate 1 and the frame members 2 is disposed on the surface of the structure 200. It should be noted that components the same as those of FIG. 1 are identified by the same reference symbols as those of FIG. 1, and descriptions related to the components are not repeated.

The box-shaped body 70 is composed of the perforated plate 1 which is a rectangular-shaped body and four frame members 2 for respectively supporting four sides of the perforated plate 1, whereby having the internal gas chamber 3 formed therein. In other words, the box-shaped body 70 constitutes the solid-borne sound reducing structure 100 in the first embodiment. As shown in FIG. 30, the solid-borne sound reducing structure 107, by way of example, includes a plurality of box-shaped bodies 70 mounted on the surface of the structure 200. The provision of the plurality of box-shaped bodies 70 allows a plurality of sections to be adjacently disposed.

Then, specifications of the perforated plate 1 and dimensions of the box-shaped bodies 70 are determined in the manner similar to that of the first embodiment.

According to the sixth embodiment, under circumstances where there is a need to adjacently dispose multiple sections, the perforated plates 1 between adjacent sections can be readily isolated. Therefore, it can be suppressed with higher reliability that vibration of the perforated plate 1 in one section is propagated to another perforated plate 1 in the adjacent section, which can bring about more stable reduction of solid-borne sound in the broader frequency range.

In addition, including a situation where number of section is one, the perforated plates 1 which is to be integrally vibrated with the surface of the structure 200 can be installed in a further easier way.

The box-shaped body may include a base plate. Because planar contact with the surface of the structure is established, installation is readily performed.

Seventh Embodiment

Figure 31A:
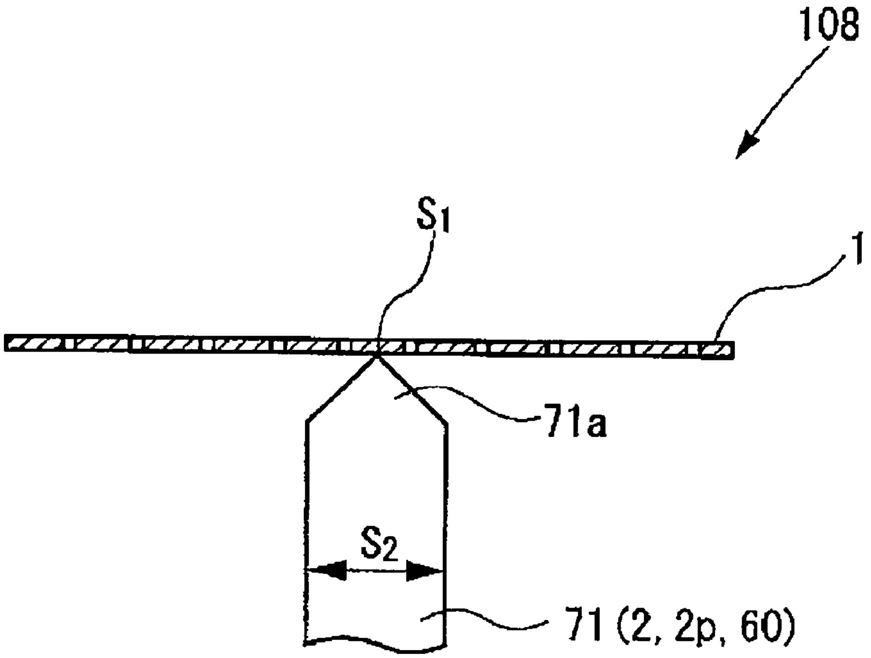
FIG. 31A is a partial enlarged view showing a solid-borne sound reducing structure according to a seventh embodiment.

FIG. 31A shows a solid-borne sound reducing structure 108 according to a seventh embodiment. The solid-borne sound reducing structure 108 according to the seventh embodiment has a configuration in which a support member 71 and the perforated plate 1 are bonded in such a manner that a contact area $S_1$ between the support member 71 and the perforated plate 1 in a joint part between the support member 71 and the perforated plate 1 becomes smaller than a cross-sectional area $S_2$ of a body part of the support member 71. Here, components the same as those of FIG. 1 are identified by the same reference symbols as those of FIG. 1, and descriptions related to the components are not repeated.

The solid-borne sound reducing structure 108 according to the seventh embodiment shown in FIG. 31A comprising the support member 71 is constructed such that a vertex part 71*a* of the support member 71 is sharpened and formed in a tapered shape in order to support, at the tapered vertex part 71*a*, the perforated plate 1 in a linear form or in a pointed form.

A moment exerted from the support member on the perforated plate 1 due to the vibration of the structure can be reduced by supporting the perforated plate 1 at the tapered vertex part 71*a*.

Here, the support member 71 may be any one of the components selected from among the frame members 2, the frame members 2*p*, and the column parts 60.

According to the configuration of the seventh embodiment, because the resonance of the perforated plate 1 can be suppressed by reducing the bending moment to be exerted on a peripheral area of the perforated plate 1, the solid-borne sound can be more stably reduced in the further broader frequency range.

Figure 31B:
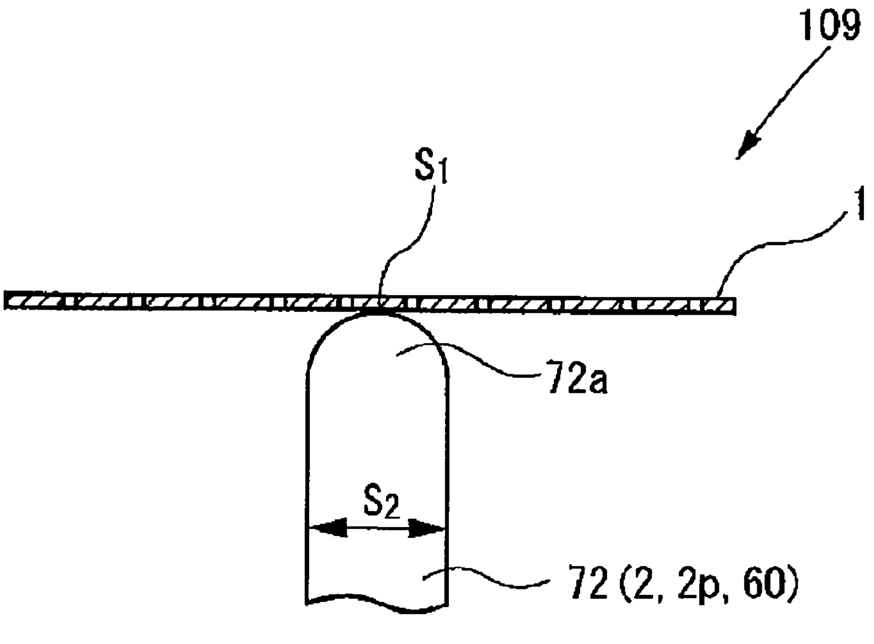
FIG. 31B is a partial enlarged view showing a modification example of the solid-borne sound reducing structure depicted in FIG. 31A.

FIG. 31B shows a modification example of the seventh embodiment. In this modification example, a vertex part 72*a* of a support member 72 in a solid-borne sound reducing structure 109 is rounded and formed in a circular or spherical shape, to thereby realize a configuration in which the perforated plate 1 is supported in the linear form or the pointed form by the rounded vertex part 72*a*. Also in the solid-borne sound reducing structure 109, the perforated plate 1 is joined to the support member 72 in such a manner that the contact area $S_1$ between the support member 72 and the perforated plate 1 becomes smaller than a cross-sectional area $S_2$ of a body part of the support member 72.

According to the solid-borne sound reducing structure 109 in the modification example, because the perforated plate 1 is supported by the circular or spherical vertex part 72*a*, the moment to be exerted on the perforated plate 1 can be reduced. Similarly with the solid-borne sound reducing structure 108 according to the seventh embodiment, the solid-borne sound reducing structure 109 is capable of suppressing the resonance of the perforated plate 1 because of the reduced bending moment to be exerted on the peripheral area of the perforated plate 1, thereby allowing more stable reduction of solid-borne sound in the further broader frequency range.

Although the embodiments of the present invention have been described above, this invention is not limited to the above-described embodiments, and may be variously changed and embodied within the scope of the claims.

Figure 27A:
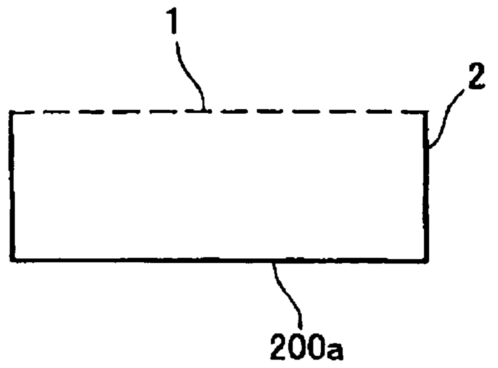
FIGS. 27A-27F illustrate a modification example of the solid-borne sound reducing structure according to the present invention.
Figure 27B:
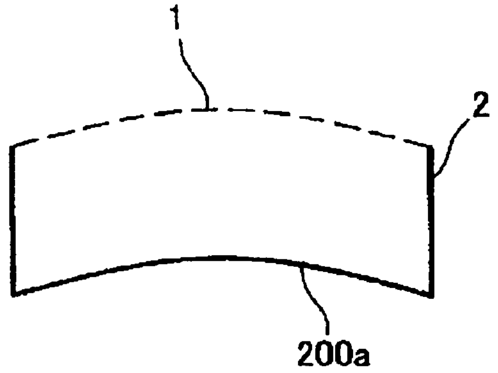
Figure 27C:
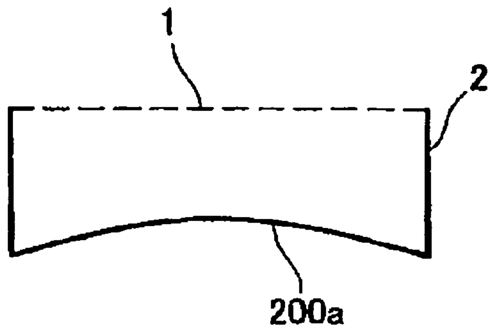
Figure 27D:
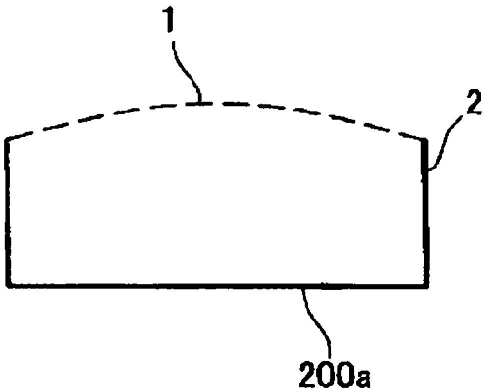

For example, as schematically shown in FIG. 27, the solid-borne sound reducing structure of the present invention is not only adapted to a case where, as described in the above embodiments, the vibration plane 200*a* of the noise radiating structure is flat and the surface plate part 1 is a flat plate (FIG. 27A), but also adapted to the cases where the vibration plane 200*a* and the surface plate part 1 have curved surface shapes as shown in FIG. 27B, where only the vibration plane 200*a* has the curved surface shape as shown in FIG. 27C, where only the surface plate part 1 has the curved surface shape as shown in FIG. 27D, etc., and may be appropriately designed depending on the shape of the noise radiating structure, installation space of the solid-borne sound reducing structure, or other requirements. When the surface plate part 1 has the curved surface shape as shown in FIGS. 27B and 27D, because flexural rigidity of the surface plate part 1 becomes higher than that of the surface plate part 1 being the flat plane, and the resonance frequency of the surface plate part 1 consequently becomes a higher frequency, radiation sound of up to further higher frequencies can be reduced.

Figure 27E:
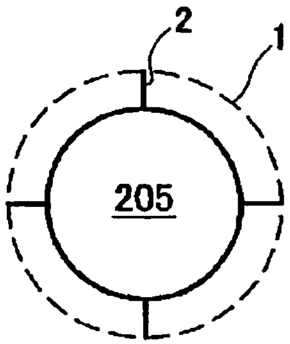
Figure 27F:
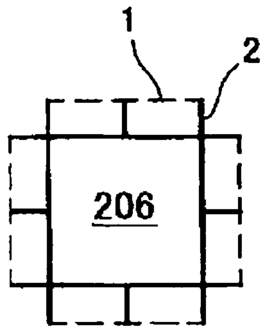

On the other hand, it is also possible to reduce solid-born sound radiated from a duct, piping, or the like. For example, as shown in FIG. 27E, the surface plate part 1 concentrically formed in the shape of a cylinder around a cylindrically-shaped structure 205 may be installed via the wall part 2. Further, as shown in FIG. 27F, the surface plate part 1 in a shape of a flat plate may be mounted on an outer surface of a structure 206 formed in a rectangular shape.

Still further, as the surface plate part 1, a perforated plate in a corrugated form, a perforated plate having a surface to which embossing is applied, a perforated plate equipped with reinforcements such as a rib, or the like may be used. Because provision of such perforated plates can increase the flexural rigidity of the surface plate part 1, the resonance frequency of the surface plate part 1 is increased to a higher frequency, to thereby allow reduction of the radiation sound of up to further higher frequencies. Moreover, it is also possible to enhance strength of the solid-borne sound reducing structure by forming the wall part as honeycomb structure.

Figures 28A, 28B, 28C, 28D:
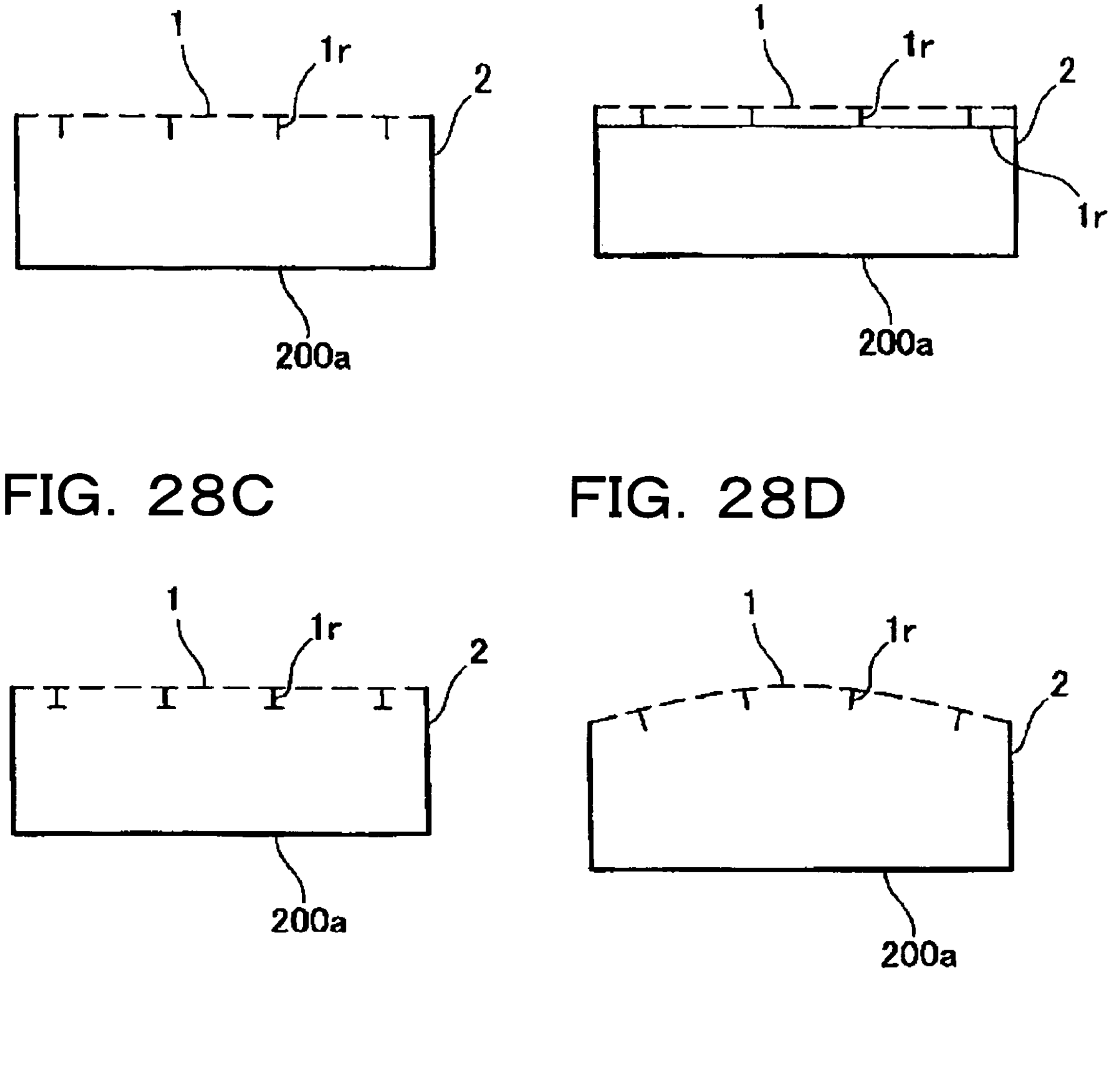
FIGS. 28A-28D illustrate a modification example of the solid-borne sound reducing structure according to the present invention.

For example, as schematically shown in FIG. 28A, ribs 1*r* may be equipped on a structure side surface of the surface plate part 1. The ribs 1*r* are continuously formed in one direction of the surface plate part 1 (a depth direction in the drawing) and able to increase flexural rigidity of the surface plate part 1. Further, in order to further enhance the flexural rigidity of the surface plate part 1, the ribs 1*r* may be formed in a lattice pattern on the surface of the surface plate part 1 as schematically shown in FIG. 28B. Still further, as schematically shown in FIG. 28C, the ribs 1*r* may be formed so as to have a cross section in the shape of a letter T. Moreover, as schematically shown in FIG. 28D, the ribs 1*r* may be formed on the surface plate part 1 which is formed in the curved surface shape.

On the other hand, using the solid-borne sound reducing structure having one internal gas chamber as one unit, a plurality of the units connected to each other may be installed, to thereby implement a usage pattern adapted to application.

The invention claimed is:

1. A solid-borne sound reducing structure installed on a surface of a structure which radiates noise while vibrating for reducing noise radiated from the surface of said structure to surroundings, comprising:

a surface plate part which is disposed so as to at least partially cover the surface of said structure, and provided with a gas ventilating part which allows gas to pass through in a thickness direction, and an outer peripheral wall part which is disposed on the surface of said structure for supporting an outer peripheral edge of said surface plate part in such a manner that said surface plate part is integrally vibrated with the surface of said structure, and forming an internal gas chamber between the surface of said structure and said surface plate part, wherein said surface plate part, said outer peripheral wall part, and at least one partition wall part are configured such that a first-order resonance frequency of said surface plate part becomes higher than a frequency band of noise to be reduced.

2. A solid-borne sound reducing structure installed on a surface of a structure which radiates noise while vibrating for reducing noise radiated from the surface of said structure to surroundings, comprising:

a surface plate part which is disposed so as to at least partially cover the surface of said structure, and provided with a gas ventilating part which allows gas to pass through in a thickness direction, and an outer peripheral wall part which is disposed on the surface of said structure for supporting an outer peripheral edge of said surface plate part in such a manner that said surface plate part is integrally vibrated with the surface of said structure, and forming an internal gas chamber between the surface of said structure and said surface plate part, wherein said surface plate part, said outer peripheral wall part, and at least one partition wall part are configured such that said surface plate part is supported by said wall parts at one or more intervals shorter than a dimension of said surface plate part with which first-order resonance of said surface plate part is excited in a frequency band of noise to be reduced.

3. A solid-borne sound reducing structure installed on a surface of a structure which radiates noise while vibrating for reducing noise radiated from the surface of said structure to surroundings, comprising:

a surface plate part which is disposed so as to at least partially cover the surface of said structure, and provided with a gas ventilating part which allows gas to pass through in a thickness direction, and an outer peripheral wall part which is disposed on the surface of said structure for supporting an outer peripheral edge of said surface plate part in such a manner that said surface plate part is integrally vibrated with the surface of said structure, and forming an internal gas chamber between the surface of said structure and said surface plate part, wherein said surface plate part, said outer peripheral wall part, and at least one partition wall part configured such that a frequency band of noise to be reduced is entirely contained in a frequency band between one resonance frequency of said surface plate part and another resonance frequency of the next higher order than the one resonance frequency.

* * * * *